US 8,254,414 B2

(12) United States Patent
Sakoda

(10) Patent No.: US 8,254,414 B2
(45) Date of Patent: Aug. 28, 2012

(54) COMMUNICATION APPARATUS AND COMMUNICATION METHOD, COMMUNICATION SYSTEM, AND COMPUTER PROGRAM

(75) Inventor: Kazuyuki Sakoda, Tokyo (JP)

(73) Assignee: Sony Corporation, Tokyo (JP)

( * ) Notice: Subject to any disclaimer, the term of this patent is extended or adjusted under 35 U.S.C. 154(b) by 668 days.

(21) Appl. No.: 12/405,295

(22) Filed: Mar. 17, 2009

(65) Prior Publication Data

US 2009/0238133 A1    Sep. 24, 2009

(30) Foreign Application Priority Data

Mar. 18, 2008 (JP) ................. P2008-069222

(51) Int. Cl.
*H04J 3/06* (2006.01)
*H04J 3/00* (2006.01)
*H04W 4/00* (2009.01)
(52) U.S. Cl. .................. 370/510; 370/329; 370/345
(58) Field of Classification Search .......... 370/325, 370/345, 503, 509–514
See application file for complete search history.

(56) References Cited

U.S. PATENT DOCUMENTS

| | | |
|---|---|---|
| 2003/0179742 A1 | 9/2003 | Ogier et al. |
| 2005/0068934 A1 | 3/2005 | Sakoda et al. |
| 2007/0274206 A1 | 11/2007 | Habetha |
| 2008/0298304 A1 | 12/2008 | Yagyu et al. |

FOREIGN PATENT DOCUMENTS

| | | |
|---|---|---|
| WO | WO 2004/071022 | 8/2004 |
| WO | WO 2007-020941 | 2/2007 |
| WO | WO 2007/020941 A1 | 2/2007 |

OTHER PUBLICATIONS

European Search Report dated Jul. 14, 2010, from European Patent Office in corresponding European application No. EP09250733.
Partial European Search Report dated May 4, 2010, from European Patent Office in corresponding European application No. EP09250733.
European Search Report dated Dec. 29, 2011, from European Patent Office in corresponding European Application No. 11188180.1, 7 pgs.

*Primary Examiner* — Ronald Abelson
(74) *Attorney, Agent, or Firm* — Finnegan, Henderson, Farabow, Garrett & Dunner, L.L.P.

(57) ABSTRACT

A communication system includes a plurality of communication stations arranged to respectively transmit a beacon on which beacon time information related to a beacon received from a peripheral communication station is placed at a predetermined transmission interval and control a beacon transmission timing of its own station while a collision with the beacon transmitted from the peripheral communication station is avoided on the basis of beacon information placed on the received beacon, in which at least a part of the communication stations includes means configured to decide a priority with respect to beacons received from at least one peripheral communication station and means configured to place beacon time information of a beacon having a high priority among the received beacons on a beacon of its own station, and transmits the beacon at a predetermined transmission interval.

20 Claims, 12 Drawing Sheets

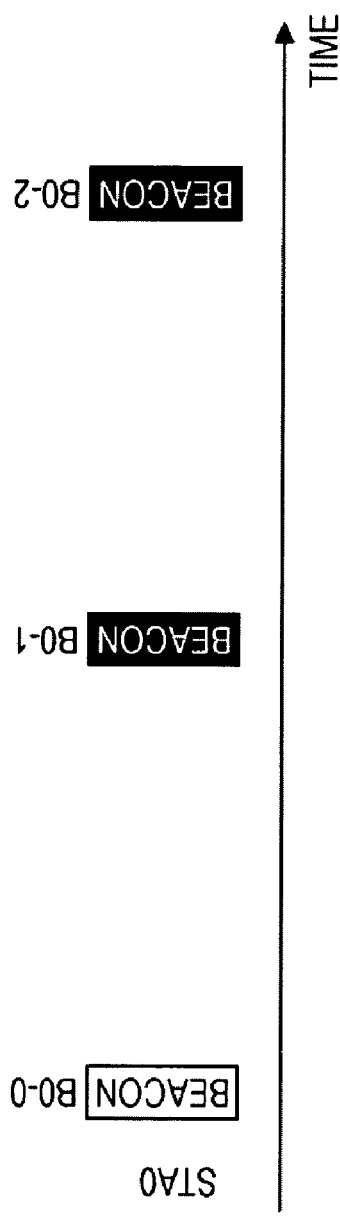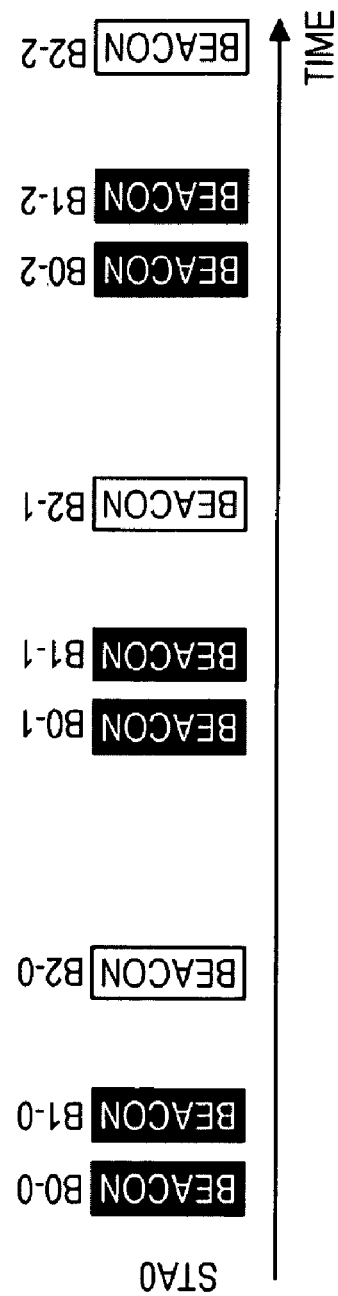

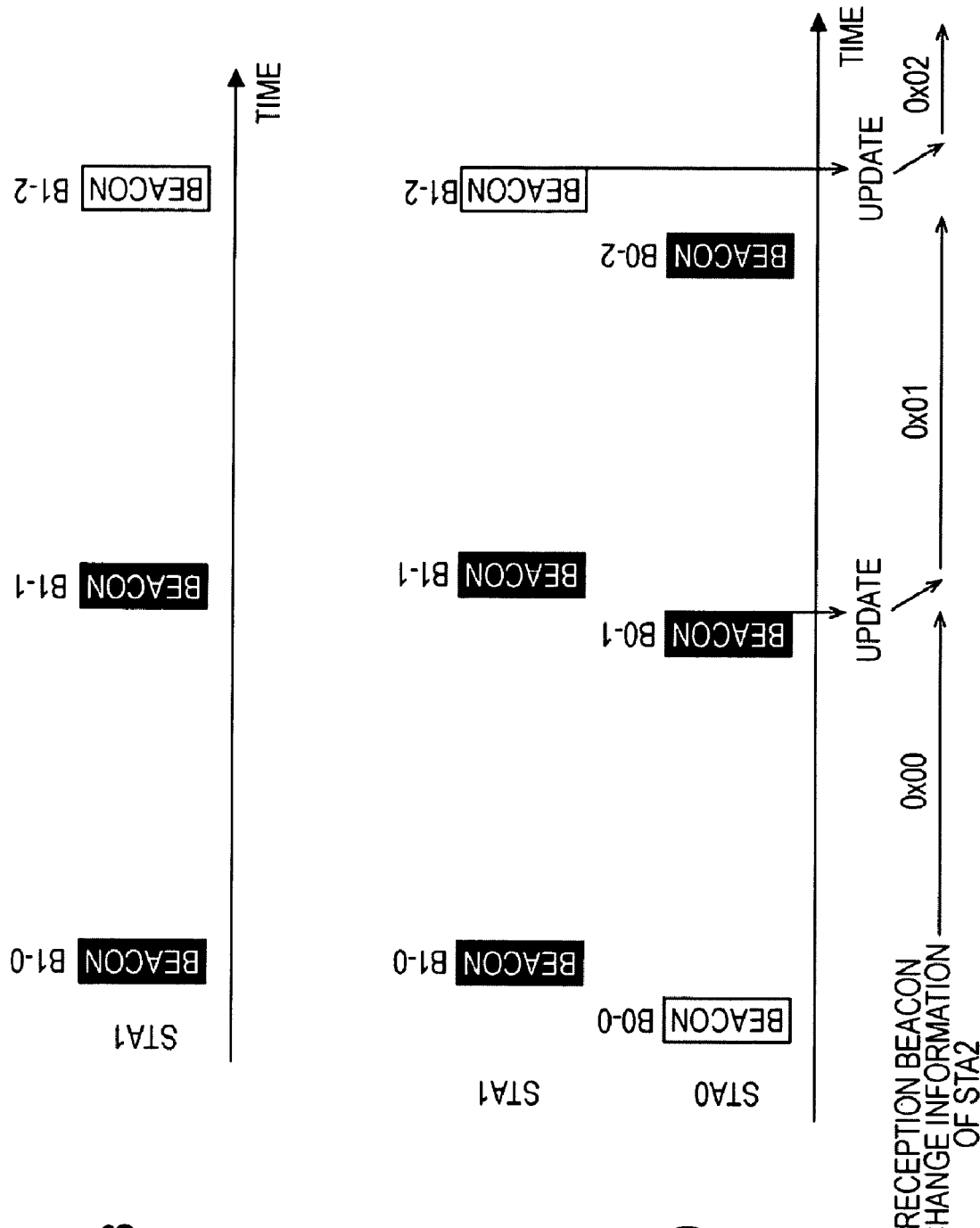

FIG. 15
(Prior Art)
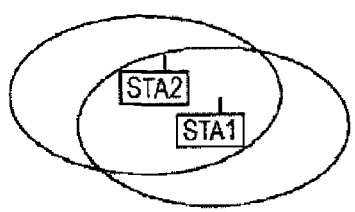
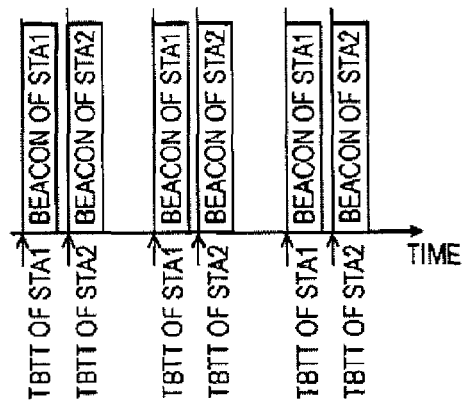
FIG. 16A
(Prior Art)
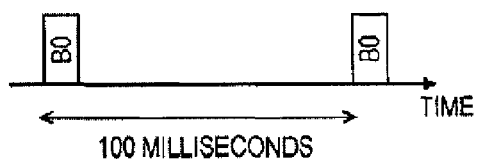
FIG. 16B
(Prior Art)
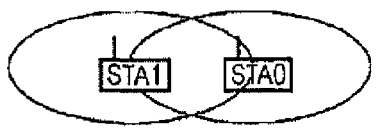
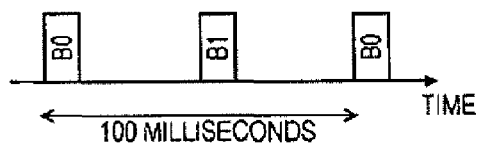
FIG. 16C
(Prior Art)
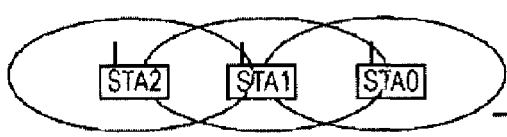
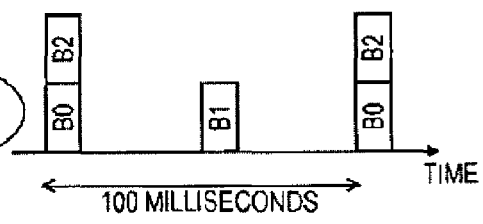

COMMUNICATION APPARATUS AND COMMUNICATION METHOD, COMMUNICATION SYSTEM, AND COMPUTER PROGRAM

CROSS REFERENCES TO RELATED APPLICATIONS

The present invention contains subject matter related to Japanese Patent Application JP 2008-069222 filed in the Japanese Patent Office on Mar. 18, 2008, the entire contents of which are incorporated herein by reference.

BACKGROUND OF THE INVENTION

1. Field of the Invention

The present invention relates to a communication apparatus and a communication method, a communication system, and a computer program in which a communication is mutually performed among a plurality of radio stations such as a wireless LAN (Local Area Network) or a PAN (Personal Area Network), in particular, a communication apparatus and a communication method, a communication system, and a computer program in which a plurality of communication stations operating in an autonomous distributed manner are connected in Peer to Peer.

More specifically, the present invention relates to a communication apparatus and a communication method, a communication system, and a computer program of a Peer to Peer style in which the communication stations operating in an autonomous distributed manner mutually exchange beacon frames to operate a communication, in particular, a communication apparatus and a communication method, a communication system, and a computer program of the Peer to Peer style in which beacon timing information received from an adjacent station is placed in the beacon frame to mitigate a beacon problem caused by a hidden terminal.

2. Description of the Related Art

As a system of liberating wires used in a wired communication system in a related art, a wireless network draws attention. For example, IEEE (The Institute of Electrical and Electronics Engineers) 802.11a, IEEE802.11b, or IEEE802.1g is typical as a wireless LAN standard. With the wireless LAN, a flexible internet connection can be established. Not only the existing wired LAN is replaced, but also internet connection means can be provided in public places such as a hotel, an airport lounge, a station, and a cafe. The wireless LAN has been already widely spread, and a wireless LAN function is now being common to be mounted not only to an information device such as a personal computer (PC) but also to a consumer electronics (CE) device such as a digital camera or a music player.

In order to construct a LAN by using a wireless technology, a method is generally used of providing one apparatus functioning as a control station called "access point (AP)" or "coordinator" in an area and forming a network under an overall control of this control station. The control station performs a synchronized wireless communication in which access timings of a plurality of terminal stations existing in the network are adjusted, and the respective terminal stations are mutually operated in synchronization.

In addition, as another method of constructing the wireless network, an "ad-hoc communication" is devised in which all the terminal stations are on an equal footing and operated in Peer to Peer in an autonomous distributed manner, and the terminal stations decide the access timings by themselves. In particular, for a small-sized wireless network constructed by a relatively small number of clients located close to each other, the ad-hoc communication is regarded as an appropriate system in which arbitrary terminals mutually can directly perform an asynchronous wireless communication without utilizing a particular control station.

For example, the networking in IEEE802.11 is based on a concept of BSS (Basic Service Set). The BSS is structured by two types including BSS defined by an "infrastructure mode" where the control station exists and IBSS (Independent BSS) defined by an "ad-hoc mode" which is structured by only a plurality of MTs (Mobile Terminal: mobile station or terminal station).

Furthermore, other than the ad-hoc network regulated by IEEE802.11, a communication system is developed in which the respective communication stations operating in an autonomous distributed manner are connected in Peer to Peer. For example, a "multi-hop communication" in which a plurality of communication stations relay frames solves a problem that all the communication parties are not particularly accommodated in a range where the radio waves reach. With the "multi-hop communication" in which the plurality of communication stations relay the frames, it is possible to mutually connect a large number of communication stations. Currently, as a task group (TG) in IEEE802.11, a standardization of the multi-hop communication is in progress. In the present specification, the wireless network carrying out the multi-hop communication is referred to as "mesh network", and the respective communication stations structuring the mesh network are referred to as "mesh point (MP)".

For example, a wireless communication system is proposed in which a network is structured while the respective communication stations transmit beacons in which information related to the network is described to each other, and a sophisticated determination is performed regarding a communication state at another communication station on the basis of the beacon (for example, see WO2004/071022). By using a similar method, the mesh network can be structured.

FIG. 15 illustrates a communication sequence example in which a wireless communication system in which a communication is performed in an autonomous distributed manner while the respective communication stations exchange beacon signals. In the example shown in this drawing, as communication stations participating the network, two stations STA1 and STA2 exist in a mutually communicable range. The respective communication stations set respective TBTTs (Target Beacon Transmission Time) and periodically transmit beacon signals. Then, as the respective communication stations extract information of the adjacent MT, as occasion demands, the communication station periodically receives the beacon signals from the other communication station. It should be noted that beacon transmission cycles are not regularly the same for all the communication stations, but herein, for simplicity of the description, the respective communication stations are supposed to transmit the beacons in the same beacon transmission cycle.

Here, in a Peer to Peer communication system, a hidden terminal problem is generated in general. In a case where a communication is performed between particular communication stations, a hidden terminal refers to a communication station which can hear from one communication station functioning as a communication party, but the communication station is difficult to hear from the other communication station. Negotiation is difficult for the hidden terminals to perform, and transmission operations may collide with each other. With reference to FIGS. 16 to 18, the beacon hidden terminal problem and a coping process thereof in the Peer to Peer communication system where the communication is carried out while the communication stations operating in an autonomous distributed manner exchange the beacon signals will be examined.

FIGS. 16A to 16C exemplify a situation where the beacon hidden terminal problem is generated in the Peer to Peer communication system.

In a situation shown in the left side of FIG. 16A, only one communication station STA0 exists. The right side of FIG. 16A shows a situation where the STA0 transmits the beacon at every 100 milliseconds. In the same drawing, B0 denotes a beacon signal transmitted by the STA0 in a cycle of 100 milliseconds.

Subsequently, the left side of FIG. 16B shows a situation where a new communication station STA1 appears in a communication range of the STA0. In this case, as the STA1 can directly receive the beacon B0 of the STA0, the STA1 appropriately find a timing during which a collision with this beacon is not generated and sets the TBTT of its own station. The right side of FIG. 16B shows a situation that as a beacon transmission time B1 of the STA1, just around a middle part of the beacon transmission cycle at 10 milliseconds of the STA0 is selected.

Furthermore, subsequently, the left side of FIG. 16B shows a situation where a STA2 (that is, which functions as a hidden terminal for the STA0 appears at a location which is within the communication range of the STA1 but no direct radio waves do not reach from the STA0. In this case, as the STA2 can directly receive the beacon B1 from the STA1, it is possible to select a time at which the collision with this beacon is not generated for the beacon transmission time B2 of its own station. However, the STA2 does not know the existence of the beacon B0 transmitted from the STA0 functioning as the hidden terminal, and therefore the beacon may be transmitted at the same time as the STA0. In such a case, in the STA1, the beacons of the STA2 and the STA0 are collided with each other, which leads to a significant problem for the operation of the network.

For example, such a method is proposed that the respective communication stations place the time information of the beacon received from an adjacent station on a beacon signal to notify each other (for example, see WO2004/071022). According to this method, the respective communication stations analyze reception beacon time information described on the beacon received from the adjacent station to detect the beacon transmission time of the hidden terminal, so that it is possible to avoid the collision.

FIG. 17 shows a format example of a beacon frame. Although omitted in the same drawing, in general, the beacon frame also includes a field indicating in which cycle the communication station which has received the frame transmits the beacon (in the frame format, it should be understood that this is included as a part of Other Information).

Various formats are conceivable for the above-mentioned "time information of the reception beacon". The frame format example shown in FIG. 17 can be represented by "Time Stamp value" which is a timer value for performing a time management of its own station and "beacon timing information (Beacon Timing)". The respective communication stations activate a timer for counting up a reference time of its own apparatus in its own apparatus, and a timer value at a moment when the frame is transmitted is placed as "Time Stamp" value in the beacon frame. Also, FIG. 18 shows a content of "beacon timing information". In the beacon timing information shown in the drawing, an element ID is used as a header, length information of the element follows, and after that, respective pieces of information "STA ID value", "beacon reception time", and "beacon interval" are placed for the number of reception beacons. For example, the communication station receiving beacons from the two communication station STA0 and STA1 describes three information sets with respect to each of the STA0 and the STA1. Herein, "STA ID value" is a value for identifying a transmission source of the beacon. "Beacon reception time" is information indicating a reception time of the beacon, and a timer value of its own apparatus when the beacon is received is described. "Beacon interval" is a value indicating a transmission frequency of the beacon (a transmission cycle of the beacon frame at the transmission source of the beacon).

By placing the beacon timing information in the beacon frame, the beacon hidden terminal problem in the Peer to Peer communication system can be significantly mitigated. In the example shown in FIG. 16C, the STA2 receives the beacon from the STA1 to analyze the beacon timing information, so that it is possible to know "at what time in further the STA1 will receive the beacon from the STA0 (hidden terminal)". Thus, it is possible to set the beacon transmission time of its own station at a time when the hidden terminal beacon is not overlapped.

However, the solving method for the hidden terminal problem of placing the beacon timing information in the beacon frame invites several new technical problems.

The first problem corresponds to a situation that in the format of the "beacon timing information" shown in FIG. 17 or 18, if the beacon time information from a large number of peripheral communication station is placed, the information amount to be placed on the beacon is large, and the beacon frame becomes enormous.

For example, when "STA ID value" is represented by 1 octet, "beacon reception time" is represented by 2 octets, and "beacon interval" is represented by 2 octets, respectively, the size of the beacon timing information for one communication station becomes 5 octets. In this case, if the beacon timing information for 16 peripheral communication stations is aimed to be placed, the total information amount of 80 octets (=(1+2+2)×16) is used, and the size is difficult to ignore.

The second problem corresponds to a situation that when the beacon transmission cycles for the respective communication station are varied, it is difficult to determine as to the presence or absence of the beacon collision. In the communication sequence example shown in FIG. 15, for simplicity of the description, the beacon transmission cycles of the communication stations participating the network are all the same. When the beacon transmission cycles of the respective communication stations are the same or in a relation of integral multiple, it is easy to determine whether or not the collision is continuously generated towards the future, but the network operation method is not limited to the above. For example, in a case where one communication station transmits the beacon at 200 millisecond interval, and the other communication station transmits the beacon at 300 millisecond interval, the beacon collision is intermittently generated, and a vague situation is generated. In this case, the determination is unclear as to regard this event as the collision or not.

SUMMARY OF THE INVENTION

According to an embodiment of the present invention, it is desirable to provide a communication apparatus and a communication method, a communication system, and a computer program which are excellent in that a plurality of communication stations operating in an autonomous distributed manner can suitably establish a Peer to Peer connection.

According to another embodiment of the present invention, it is desirable to provide a communication apparatus and a communication method, a communication system, and a computer program of a Peer to Peer style which are excellent in that the communication stations operating in an autonomous distributed manner mutually exchange beacon frames so that a communication is suitably carried out.

According to another embodiment of the present invention, it is desirable to provide a communication apparatus and a communication method, a communication system, and a computer program of a Peer to Peer style which are excellent in that a beacon hidden terminal problem can be mitigated by placing beacon timing information received from an adjacent station in a beacon frame.

According to another embodiment of the present invention, it is desirable to provide a communication apparatus and a communication method, a communication system, and a computer program of a Peer to Peer style which are excellent in that the respective communication stations place beacon time information received from a peripheral communication station in a beacon frame with still smaller information amount and can suitably operate a network.

According to another embodiment of the present invention, it is desirable to provide a communication apparatus and a communication method, a communication system, and a computer program of a Peer to Peer style which are excellent in that the respective communication stations can suitably operate a network while a collision of beacon frames is avoided under a communication environment where the beacon frames are mutually exchanged at uneven beacon transmission intervals.

The present invention has been made in view of the above-mentioned circumstances, and according to an embodiment of the present invention, there is provided a communication system including a plurality of communication stations arranged to respectively transmit a beacon on which beacon time information related to a beacon received from a peripheral communication station is placed at a predetermined transmission interval and control a beacon transmission timing of its own station while a collision with the beacon transmitted from the peripheral communication station is avoided on the basis of beacon information placed on the received beacon, in which at least a part of the communication stations includes means configured to decide a priority with respect to beacons received from at least one peripheral communication station and means configured to place beacon time information of a beacon having a high priority among the received beacons on a beacon of its own station, and transmits the beacon at a predetermined transmission interval.

It should be noted that the "system" herein refers to a structure in which a plurality of apparatuses (or functional modules for realizing a particular function) are logically aggregated, and whether the respective apparatuses or functional modules are in a single casing or not does not particularly matter.

As a mode of the wireless network in which the respective communication stations operating in an autonomous distributed manner establish a Peer to Peer connection, an ad-hoc mode where the respective terminal stations decide the access timing by themselves and further a mesh network in which a plurality of communication stations relay the frames to enable a multi-hop communication are proposed. In this type of the communication system, such an operation method is generally employed that the respective communication stations exchange the beacon signals to establish a connection in an autonomous distributed manner. Also, in order to suppress the beacon collision between the communication stations functioning as the hidden terminals, such a method is proposed that the respective communication stations place the beacon time information received from the peripheral communication station on the beacon of its own station and analyze the content of the received beacon to control the beacon transmission timing of its own station so as not to be overlapped with the beacon transmission time of another station.

However, if the beacon time information from a large number of peripheral communication stations is placed, there is a problem that the information amount to be placed on the beacon is large, and the beacon frame becomes enormous. Also, when the beacon transmission cycles for the respective communication station are varied, there is a problem that it is difficult to determine as to the presence or absence of the beacon collision.

In contrast to this, in the communication system according to the embodiment of the present invention, the communication station decides the priority of the beacons received from one or more peripheral communication station and places the beacon time information of only the beacon having the high priority among the received beacons on the beacon of its own station. Herein, the beacon having the high priority is equivalent to a beacon having a high urgency of notification to an adjacent station; for example, the reception state of the beacon is changed. Therefore, the communication station places the time information of beacon whose reception state is changed among the beacons received from at least one peripheral communication station on the beacon of its own station. In other words, even when the number of the beacons received from the peripheral communication stations (the number of the peripheral communication stations to which the beacons arrive) is large, the respective communication stations omit the placement of the time information of the beacon whose reception state is not fluctuated on the beacon of its own station, so that it is possible to suppress the ballooning of the beacon frame.

For example, the priority decision means set a high priority to a beacon whose reception state is changed among the beacons received from at least one peripheral communication station. Alternatively, the priority decision means set a high priority, among the beacons received from at least one peripheral communication station, to a beacon whose reception interval is close to the beacon received from another communication station because a possibility that the collision may be generated is high due to the fluctuation in the beacon transmission timing, and an urgency of an action is considered to be high.

When the beacon timing information only of the reception beacon having the high priority is placed, there is a beacon which has been actually received but which is not placed on the "beacon timing information" in the beacon frame. In view of the above, the beacon generation means may place information on the beacon indicating whether or not all the reception beacons placed on the current beacon timing information are all the beacons. Also, the communication station which has received the beacon describing such information from peripheral communication station analyzes the reception beacon and detects that another reception beacon exists for the beacon transmission source. Furthermore, in a case where it is determined that more pieces of beacon timing information than those placed on the reception beacon should be obtained by its own station, the hand shake operation for obtaining all the beacon timing information from the beacon transmission source may be performed.

Also, the communication station may place information whether or not the reception state of the beacon is changed on the beacon. The reception beacon change information is the information indicating the change in the state of the reception beacon as long as being observed by its own station. For example, there is a role of notifying the peripheral station of the change by using a 1-bit flag to indicate the change and placing the information by changing a numeral value each time the reception beacon state is changed. The change in the reception state of the beacon described in the present specification includes disappearance of the beacon which has been periodically received thus far, starting of reception of a beacon which has not been observed thus far, change in the transmission interval of the beacon which has been received thus far, proximity in reception intervals of beacons received from different peripheral communication stations, and the like.

Also, the communication station which has received the beacon describing the information indicating the change in the state of the reception beacon from peripheral communication station may perform the hand shake operation for obtaining all the beacon timing information from the beacon transmission source in a case where it is determined that it is difficult to obtain sufficient information from the beacon timing information where the change is placed on the beacon.

Also, according to another embodiment of the present invention, there is provided a communication system including a plurality of communication stations arranged to respectively transmit a beacon on which beacon time information and a beacon transmission cycle related to a beacon received from a peripheral communication station are placed at a predetermined transmission interval and transmit the beacon in each beacon transmission cycle of its own station while a collision with the beacon transmitted from the peripheral communication station is avoided on the basis of beacon information placed on the received beacon, in which at least a part of the communication stations calculates a frequency of potentially generated beacon collisions on the basis of beacon time information and a beacon transmission cycle of the peripheral communication station which has received the beacon by itself and beacon time information and a beacon transmission cycle related to the peripheral communication station described in the received beacon and performs a processing for avoiding the beacon collisions in its own station and the peripheral communication station in accordance with the frequency of the collisions.

As described above, when the beacon transmission cycles for the respective communication station are varied, there is a problem that it is difficult to determine as to the presence or absence of the beacon collision, but in the communication system according to the embodiment of the present invention, when the communication station obtains the beacon time information and the beacon transmission cycles of the respective peripheral communication stations on the basis of the beacon time information and the beacon transmission cycles obtained from the beacon received by itself and the analysis result of the placed content of the beacon, the frequency of the potentially generated beacon collisions is calculated from the above-mentioned information. Then, the seriousness of the collisions is determined by using the frequency of the collisions as the reference, and the beacon transmission timing of its own station is changed. Furthermore, by requesting the change in the beacon transmission timing to the peripheral communication station where the collision becomes serious, the beacon hidden terminal problem is aimed to be solved.

Also, according to another embodiment of the present invention, there is provided a computer-readable computer program for executing a processing on a computer to operate as a communication station under a communication environment where the respective communication stations operating in an autonomous distributed manner establish a Peer to Peer connection, the program allowing the computer to function as: reception means configured to receive a frame including a beacon from a peripheral communication station; beacon analysis means configured to analyze the beacon received by the reception means; priority decision means configured to decide a priority with respect to the respective beacons received from the peripheral communication station by the reception means; beacon generation means configured to generate a beacon on which beacon timing information related to a reception time of a beacon having a high priority among the beacons received from the peripheral communication station is placed; transmission means configured to transmit a frame including the beacon generated by the beacon generation means; control means configured to control frame transmission and reception operations performed by the transmission means and the reception means; and timing control means configured to control frame transmission and reception timings including a beacon transmission timing of its own station while a collision with the beacon transmitted from the peripheral communication station is avoided on the basis of beacon timing information of the peripheral communication station obtained from a result of the beacon analysis performed by the beacon analysis means.

Also, according to another embodiment of the present invention, there is provided a computer-readable computer program for executing a processing on a computer to operate as a communication station under a communication environment where the respective communication stations operating in an autonomous distributed manner establish a Peer to Peer connection, the program allowing the computer to function as: reception means configured to receive a frame including a beacon from a peripheral communication station; beacon analysis means configured to analyze the beacon received by the reception means; beacon generation means configured to generate a beacon on which beacon time information related to the respective beacons received from the peripheral communication station and beacon timing information including a beacon transmission cycle are placed; transmission means configured to transmit a frame including the beacon generated by the beacon generation means; control means configured to control frame transmission and reception operations performed by the transmission means and the reception means; and timing control means configured to control frame transmission and reception timings including a beacon transmission timing of its own station while a collision with the beacon transmitted from the peripheral communication station is avoided on the basis of beacon timing information of the peripheral communication station obtained from a result of the beacon analysis performed by the beacon analysis means, in which the control means calculates a frequency of potentially generated beacon collisions on the basis of beacon time information and a beacon transmission cycle of the peripheral communication station which has received the beacon by itself and beacon time information and a beacon transmission cycle related to the peripheral communication station described in the received beacon and performs a processing for avoiding the beacon collisions in its own station and the peripheral communication station in accordance with the frequency of the collisions.

The computer program according to the embodiment of the present invention defines a computer program described in a computer readable format for realizing a predetermined processing on the computer system. In other words, by installing the computer program according to the embodiment of the present invention into the computer, a cooperative action is realized on the computer, and the computer is operated as the communication station in an autonomous distributed manner. By constructing the wireless network by activating a plurality of such communication stations, a similar action effect to the communication system according to the embodiment of the present invention can be obtained.

According to the embodiment of the present invention, it is possible to provide the communication apparatus and the communication method, the communication system, and the computer program which are excellent in that the plurality of communication stations operating in an autonomous distributed manner can suitably establish the Peer to Peer connection.

Also, according to the embodiment of the present invention, it is possible to provide the communication apparatus and the communication method, the communication system, and the computer program of the Peer to Peer style which are excellent in that the communication stations operating in an autonomous distributed manner mutually exchange the beacon frames so that the communication is suitably carried out.

Also, according to the embodiment of the present invention, it is possible to provide the communication apparatus and the communication method, the communication system, and the computer program of the Peer to Peer style which are excellent in that the beacon hidden terminal problem can be mitigated by placing the beacon timing information received from the adjacent station in the beacon frame.

Also, according to the embodiment of the present invention, it is possible to provide the communication apparatus and the communication method, the communication system, and the computer program of the Peer to Peer style which are excellent in that the respective communication stations place the beacon time information received from the peripheral communication station in the beacon frame with the still smaller information amount and can suitably operate the network.

Also, according to the embodiment of the present invention, it is possible to provide the communication apparatus and the communication method, the communication system, and the computer program of the Peer to Peer style which are excellent in that the respective communication stations can suitably operate the network while the collision of the beacon frames is avoided under the communication environment where the beacon frames are mutually exchanged at the uneven beacon transmission intervals.

Further features and advantages of the present invention will become apparent from the following description of exemplary embodiments with reference to the attached drawings.

BRIEF DESCRIPTION OF THE DRAWINGS

FIG. 5 is an explanatory diagram for describing a setting method for a priority of a reception beacon;

FIG. 6 is an explanatory diagram for describing the setting method for the priority of the reception beacon;

FIG. 8 is an explanatory diagram for describing a method for the communication station to determine whether a change in a reception state of the beacon is generated;

FIG. 9 is an explanatory diagram for describing a setting method for the reception beacon change information composed of numeral values;

FIG. 15 illustrates a communication sequence example in a wireless communication system in which a communication is performed in an autonomous distributed manner while the respective communication stations exchange the beacon signals;

FIG. 16A exemplifies a situation where the beacon hidden terminal problem is generated in a Peer to Peer communication system;

FIG. 16B exemplifies a situation where the beacon hidden terminal problem is generated in the Peer to Peer communication system;

FIG. 16C exemplifies a situation where the beacon hidden terminal problem is generated in the Peer to Peer communication system;

DESCRIPTION OF THE PREFERRED EMBODIMENTS

Hereinafter, embodiments of the present invention will be described in detail with reference to the drawings.

According to the embodiments described below, a propagation channel for a communication is supposed to be wireless, and also a network is constructed between a plurality of devices by using single transmission medium (corresponding to a case in which a link is not separated by a frequency channel). It should be noted that even in a case where a plurality of frequency channels exist as transmission media, the same applies. Also, according to the embodiments, the communication is supposed to be traffic of a store-and-forward type, and information is transferred in units of packets. Also, a processing in the respective communication stations described below is basically a processing executed in all the communication stations participating the network. It should be noted that depending on a case, some communication stations structuring the network do not execute the processing described below on a regular basis.

Figure 1:
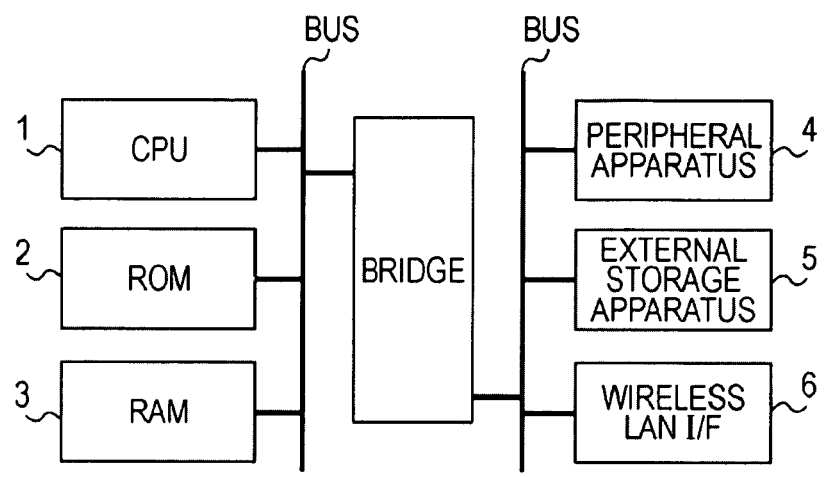
FIG. 1 is a schematic view of a hardware configuration example of a wireless apparatus capable of being connected to another station in Peer to Peer by performing a communication operation in an autonomous distributed manner as a communication station in a wireless network according to an embodiment of the present invention.

FIG. 1 is a schematic view of a hardware configuration example of a wireless apparatus capable of being connected to another station in Peer to Peer by performing a communication operation in an autonomous distributed manner as a communication station in a wireless network according to an embodiment of the present invention. The wireless apparatus is an information device on which a wireless LAN card is mounted such as a personal computer or a CE device such as a digital camera or a music player.

In the wireless apparatus shown in the drawing, a CPU (Central Processing Unit) 1 is mutually connected via a bus to memory apparatuses such as a ROM (Read Only Memory) 2 and a RAM (Random Access Memory) 3, a peripheral apparatus 4, an external storage apparatus 5 such as an HDD (Hard Disk Drive), and a peripheral apparatus such as a wireless LAN interface unit 6. Also, two or more buses are linked via a bridge apparatus.

The CPU 1 loads a control code stored in the ROM 2 or a program code installed into the external storage apparatus 5 onto the RAM 3 and executes the code to perform an overall control on the entire apparatus such as an apparatus operation using the peripheral apparatus 4 (for example, an image pickup operation and an image reproduction operation in the digital camera and a play list display and a music reproduction operation in the music player) and a communication operation using the wireless LAN interface unit 6.

Figure 2:
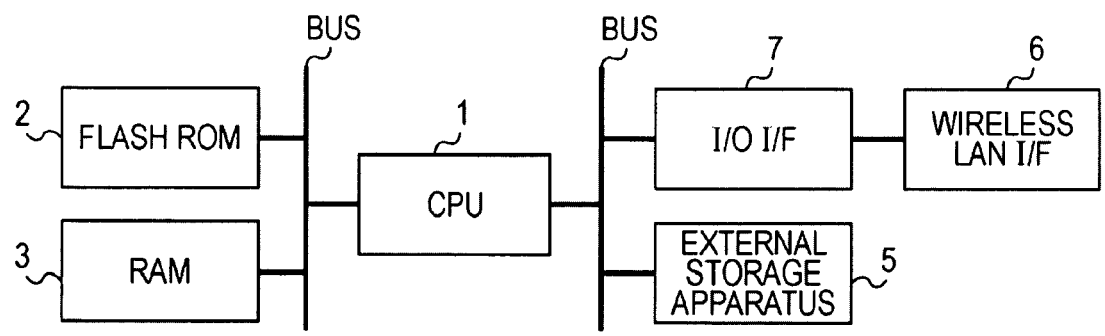
FIG. 2 is a schematic view of another hardware configuration example of a wireless apparatus capable of being connected to another station in Peer to Peer by performing a communication operation in an autonomous distributed manner as the communication station in a wireless network according to an embodiment of the present invention.

In the example of FIG. 1, the wireless LAN interface unit 6 transfers a frame in a MAC (Media Access Control) layer of IEEE802 via the bus to the RAM 3, and the CPU 1 performs a processing in the MAC layer. It should be noted that the gist of the present invention is not limited to the configuration of the wireless apparatus illustrated in FIG. 1, and another configuration illustrated in FIG. 2 is also conceivable. In FIG. 2, the wireless LAN interface unit 6 is connected to the bus via an I/O interface 7. The I/O interface 7 connecting the wireless LAN interface unit 6 and the bus is generally an MSIO (Memory Stick IO), an SDIO (Secure Digital IO), a USB (Universal Serial Bus), or the like. The wireless interface unit 6 performs a processing in the MAC (Media Access Control) layer of IEEE802.11 and transmits a frame equivalent to IEEE802.3 through the I/O interface 7 to the host CPU 1.

As the wireless interface unit 6 is mounted on the information device illustrated in FIGS. 1 and 2, for example, the information device can function as a terminal station (Mobile terminal: MT) operating on the ad-hoc network or a mesh point (Mesh Point: MP) operating on the mesh network. Also, the information device illustrated in FIGS. 1 and 2 is supposed to be of a battery drive system in which drive electric power is supplied from a battery (not shown) and is provided with a charger for charging the battery. The information device may control a charging operation based on the charger by calculating the remaining power from an output terminal voltage of the battery or the like.

Figure 3:
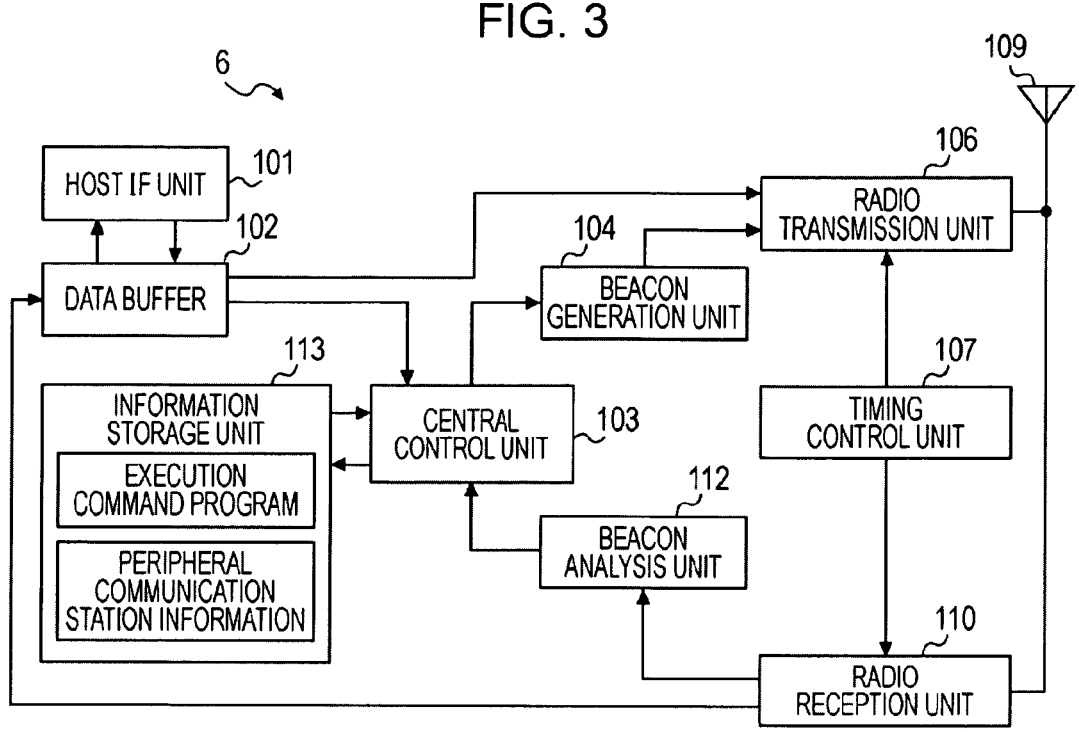
FIG. 3 illustrates an internal configuration example of a wireless interface unit.

FIG. 3 illustrates an internal configuration example of the wireless interface unit 6. The wireless interface unit 6 shown in the drawing is operated as the communication station under a communication environment of an autonomous distributed type where the control station is not arranged. By effectively performing a channel access in the same wireless system, it is possible to form a network while the collision is avoided.

As illustrated in the drawing, the wireless interface unit 6 functioning as the communication station is composed of a host interface unit 101, a data buffer 102, a central control unit 103, a beacon generation unit 104, a radio transmission unit 106, a timing control unit 107, a antenna 109, a radio reception unit 110, the beacon analysis unit 112, and an information storage unit 113.

The host interface unit 101 performs exchange of various pieces of information with the host device (see FIG. 1 or 2) which is connected to the I/O interface 7.

The data buffer 102 is used for temporarily storing the data transmitted from the host device connected via the host interface unit 101 or the data received via the wireless transmission channel before being transmitted via the host interface unit 101.

The central control unit 103 executes a predetermined execution command program to perform a management of a series of information transmission and reception processings in the wireless interface unit 6 functioning as the communication station and the access control of the transmission channel in an integrated manner.

According to the present embodiment, the central control unit 103 executes a processing for realizing the access control and the like in the autonomous distributed type network such as the ad-hoc network or the mesh network. Also, the access control described herein includes a processing such as a control on the beacon transmission timing of its own station on the basis of the beacon time information of the peripheral communication station which is placed on the beacon. A detail of these processings will be described below.

The beacon generation unit 104 generates the beacon signal which is periodically exchanged with the nearby communication station. In order for the wireless apparatus provided with the wireless interface unit 6 to operate the wireless network, its own beacon transmission position, the beacon reception position from the adjacent station, and the like are regulated. These pieces of beacon time information are stored in the information storage unit 113 and also placed in the beacon signal to notify the adjacent communication station. As the respective communication stations transmit the beacon at the beginning of the transmission frame cycle, the transmission frame cycle in the channel is defined by the beacon interval. It should be noted that a detail of the method for placing the beacon time information of the peripheral communication station in the beacon signal will be described below.

The radio transmission unit 106 performs a predetermined modulation processing for wirelessly transmitting the data temporarily stored in the data buffer 102 or the beacon signal. Also, the radio reception unit 110 performs a reception processing on the information transmitted from another station at a predetermined time or the signal such as the beacon.

For the wireless transmission and reception method in the radio transmission unit 106 and the radio reception unit 110, for example, it is possible to apply various communication methods which are suitable for a communication in a relatively short distance applicable to the wireless LAN. To be more specific, a UWB (Ultra Wide Band) method, an OFDM (Orthogonal Frequency Division Multiplexing) method, a CDMA (Code Division Multiple Access) method, and the like can be adopted.

The antenna 109 wirelessly transmits the signal to another communication station on a predetermined frequency channel or collects a signal arriving from another communication station. According to the present embodiment, a signal antenna used by the transmission and reception devices is provided, but the transmission and the reception are not simultaneously performed in parallel.

The timing control unit 107 performs a control on the timings for transmitting and receiving the radio signals. For example, its own beacon transmission timing at the beginning of the transmission frame cycle, the beacon reception timing from the adjacent station, the data transmission and reception timings with the adjacent station, the scan operation cycle, and the like are controlled.

The beacon analysis unit 112 analyzes the beacon signal which can be received from the adjacent station and also analyzes the existence of the peripheral communication station including the hidden terminal or the like. For example, the beacon timing information of the adjacent station such as the TBTT which is extracted from the beacon signal is stored in the information storage unit 113 as the peripheral communication station information.

The information storage unit 113 accumulates the execution procedure command (program describing the collision avoiding processing procedure and the like) such as a series of the access control operations executed in the central control unit 103, the peripheral communication station information obtained from the analysis result of the reception beacon, and the like.

According to the present embodiment, the wireless apparatus provided with the wireless interface unit 6 is operated as the communication station (the terminal station (MT) or the mesh point (MP)) participating the autonomous distributed type network such as the ad-hoc network or the mesh network. In the above-mentioned autonomous distributed type network, the hidden terminal problem is generated when the beacon is exchanged between the communication stations. According to the present embodiment, such a feature is provided that the respective communication stations mutually notify the beacon time information to be used while suppressing the information amount irrespective of the increase in the number of the peripheral communication stations, and even in a case where the respective communication stations are operated in different beacon cycles, the generation of the collision can be suppressed. To be more specific, without the fluctuation in the reception state, regarding the beacon time information, by omitting the placement on the beacon of its own station, the ballooning of the beacon frame suppressed. Also, in a case where the respective terminals perform the beacon operation in various beacon cycles, a measure is taken in accordance with the seriousness of the collisions while the collision of the beacons is determined by using the frequency of the collisions supposed to be generated in future as the reference. Hereinafter, these processing operations will be described below.

Figure 4:
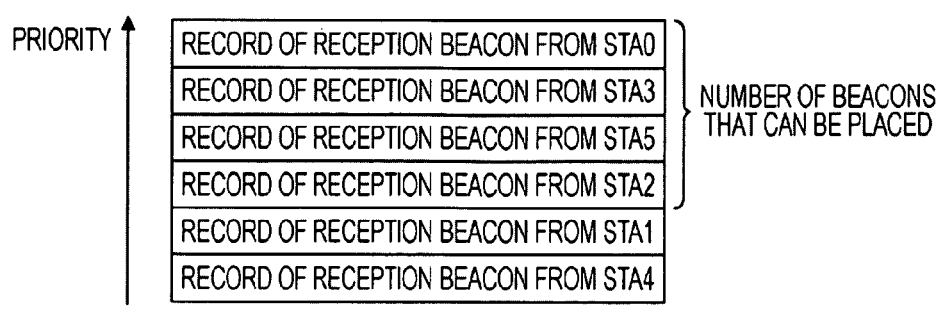
FIG. 4 is an explanatory diagram for describing a management method for beacon reception information performed in the communication station.

First, a management method for the beacon reception information performed by the communication station will be described with reference to FIG. 4.

The respective communication stations perform the autonomous distribution operation while exchanging the beacon. However, if all the information related to the reception beacon is placed, the beacon becomes enormous. Therefore, such an approach is adopted that a priority is assigned to the record of the reception beacon, and only the record with the high priority is placed on the transmission beacon from its own station. In the example shown in FIG. 4, as the peripheral communication station information, the records of the beacon timing information respectively received from six peripheral communication stations STA0 to STA5 are held in the information storage unit 113. Among them, only four records having the high priority (the records of the beacon timing information regarding the STA0, the STA3, the STA5, and the STA2) are extracted and placed on the transmission beacon. The method of assigning the priority of the reception beacon will be described below. Also, the communication station previously determines the number of records which can be placed on the transmission beacon and sorts out the reception beacons in order of priority. After that, only the predetermined number of records may be placed in some cases, or without determining the number of records, only the records having the high priority may be extracted from the peripheral communication station information and placed on the beacon of its own station.

The beacon having the high priority is equivalent to the beacon having a high urgency to be notified to the adjacent station such as the beacon whose reception state is changed. By only placing the beacon information with the high priority among the received beacon information as the "beacon timing information" as described above, the notification on the beacon information with the high urgency is guaranteed.

Subsequently, the setting method for the priority of the reception beacon will be described with reference to FIGS. 5 and 6.

FIG. 5 illustrates a communication sequence example in which the beacon of the STA0 is not observed at the beginning, but the beacon is started to be received with the beacon at a time B0-1. It should be noted that in the same drawing, the highlighted beacons are the reception beacons, and the other beacons are the beacons which are not received.

The communication station receiving the beacon at the time B0-1 analyzes the beacon information, and it is found out that the STA0 also transmitted the beacon at a time B0-0, but this beacon is not received due to some reason. Therefore, the beacon received at the time B0-1 is determined as the beacon newly received, and because the fluctuation in the state of the reception beacon is caused, such a processing is performed that this record is assigned with the high priority and described in the "beacon timing information" with the high priority.

FIG. 5 illustrates the example in which the beacon which has not been received thus far is started to be received. In contrast to the above, in a case where it becomes clear that the "interval of beacon transmission is changed although the beacon has been received thus far", for example, the fluctuation in the state of the reception beacon is caused, and the processing is performed that this record is assigned with the high priority, and described in the "beacon timing information" with the high priority.

Also, as another example of the beacon having the high priority, a beacon whose reception interval is close to the reception beacon from another communication station can be represented. FIG. 6 illustrates a communication sequence example in which the beacons respectively transmitted from the three communication stations the STA0, the STA1, and the STA2 in the same cycle are periodically received. It should be noted that in the same drawing, highlighted beacons are the beacons having the high priority, and the other beacons are the beacons having the low priority. That is, B0-0, B0-1, and B0-2 represent beacons received from the STA0, B1-0, B1-1, and B1-2 represent beacons received from the STA1, and B2-0, B2-1, B2-2 represent beacons received from the STA2, respectively.

At this time, as an interval between the beacon frames transmitted from the STA0 and the STA1 is below a certain threshold, and it is determined that the interval between the frames is small. The small interval between the frames means that the frames may be collided when the timings are slightly deviated. In view of the above, in the communication station which receives the beacons from both the STA0 and the STA1, it is determined that the beacons may be collided with each other at risk, and the records are assigned with the high priority to perform the processing of placing the beacon in the "beacon timing information" with the high priority.

Subsequently, as described above, a format example of a beacon frame for placing the beacon timing information only on the reception beacon having the high priority will be described with reference to FIG. 7.

When the beacon timing information only of the reception beacon having the high priority is placed, the beacon which has been actually received but is not placed on the "beacon timing information" in the beacon frame exists. For this reason, the communication station may notify the peripheral stations in some cases that the "beacon periodically received exists in addition to the beacon placed on the beacon frame". In view of the above, in the format example of the beacon frame shown in FIG. 7, in the field of the "beacon timing information", a field called "more beacon info" for indicating that another reception beacon exists is prepared. By using this field, it is indicated whether or not the reception beacons placed on the current beacon timing information are all the beacons.

Also, when the communication station receives the beacon from the peripheral station, the "beacon timing information" in the reception beacon the more beacon info field is checked. Then, in a case where it is determined that more pieces of the beacon timing information than those placed on the reception beacon should be obtained, the request frame for requesting a notification on all the pieces of beacon timing information is transmitted to the beacon transmission source station in some cases. A hand shake in performed in such a manner that the communication station receiving this request frame generates the "beacon timing information" by using the information including all the beacons recently received irrespective of the priority and places this information in the response frame to reply for responding to the request. Through the above-mentioned hand shake, the communication station can obtain all the beacon timing information received by the peripheral station from the received response frame.

Figure 7:
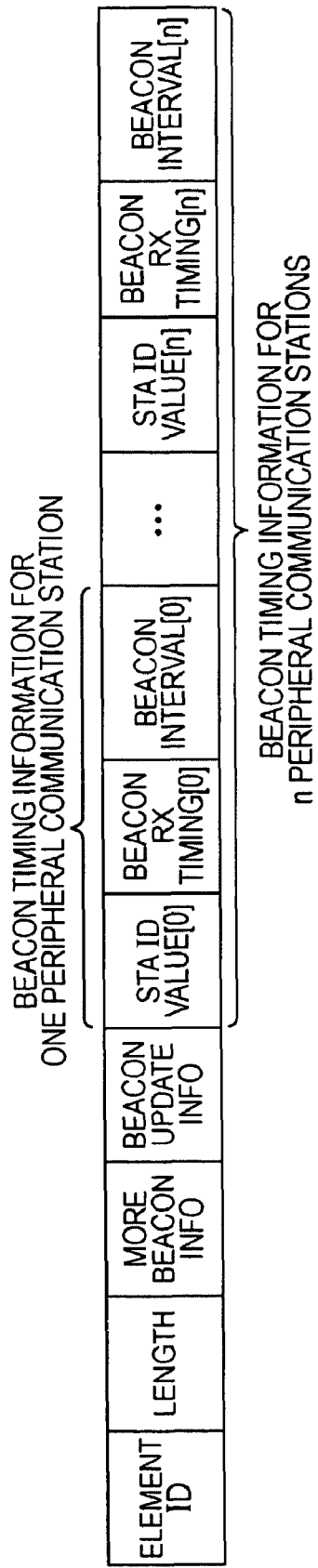
FIG. 7 illustrates a format example of a beacon frame in a case where beacon timing information is placed only on the reception beacon having a high priority.

It should be noted that according to the embodiment in which the more beacon info field shown in FIG. 7 is utilized, there may be such a case that none of the records of the reception beacon time placed in the beacon frame in a related art is placed. This is because the situation is equivalent to the above-mentioned case where the "number of records which can be placed on predetermined transmission beacon" is zero, but through the hand shake of the frame response with the above-mentioned request frame, the actual beacon reception time is notified.

Also, in the format example of the beacon frame shown in FIG. 7, as the "beacon timing information" in the beacon frame, in addition to the "more beacon info" filed for indicating that the reception beacon other than those placed exists, a field called "beacon update info" for indicating that the beacon reception state is changed is prepared. The reception beacon change information is the information indicating the change in the state of the reception beacon as long as being observed by its own station. For example, there is a role of notifying the peripheral station of the change by using a 1-bit flag to indicate the change and placing the information by changing a numeral value each time the reception beacon state is changed.

In such a case, the communication station checks the beacon update info field in the "beacon timing information" of in the beacon received from the peripheral communication station. Then, it is confirmed that the beacon reception state is changed, but in a case where it is determined that sufficient information is difficult to be obtained from the beacon timing information where the change is placed on the beacon, a request frame for requesting a notification on all the received beacon timing information is transmitted to the beacon transmission source station in some cases. The hand shake in performed in such a manner that the communication station receiving this request frame generates the "beacon timing information" by using the information including all the beacons recently received irrespective of the priority and places this information in the response frame to reply for responding to the request. Then, the communication station can obtain all the beacon timing information received in the peripheral communication station by receiving the above-mentioned response frame.

It should be noted that according to the embodiment in which the more beacon info field shown in FIG. 7 is utilized, there may be such a case that none of the records of the reception beacon time placed in the beacon frame in a related art is placed. This is because the situation is equivalent to the above-mentioned case where the "number of records which can be placed on predetermined transmission beacon" is zero, but through the hand shake of the frame response with the above-mentioned request frame, the actual beacon reception time is notified.

Subsequently, a method for the communication station to determine whether or not the reception state of the beacon is changed will be described with reference to FIGS. 5 and 8. It should be noted that in the respective drawings, the highlighted beacons are the reception beacons, and the other beacons are the beacons which are not received.

FIG. 8 illustrates a communication sequence example in which the beacon which has been received form the STA1 thus far is not received. The communication station periodically receives the beacon at B1-0 and B1-1 from the STA1. However, the communication station does not receive the beacon supposed to be received next at a time around B1-2. Therefore, the communication station determines that this beacon disappears and that the beacon reception state is changed, and checks the beacon update info field.

FIG. 5 illustrates the communication sequence example in which the beacon of the STA0 is not observed at the beginning, but the beacon is started to be received with the beacon at the time B0-1 (as described above). On the basis of the above-mentioned logic, the communication station determines this beacon is a beacon started to be newly received and that the change in the state of the reception beacon is caused, and checks the beacon update info field.

It should be noted that although not shown in the drawing, also in a case where the beacon has been received from the same peripheral communication station thus far but it becomes clear that the interval of the beacon transmission is changed from this time, the communication station regards that the change in the state of the reception beacon is caused.

Also, as already described with reference to FIG. 6, the information as to whether or not the time interval between the beacons transmitted from the different peripheral communication stations is below a certain threshold becomes important information for predicting the beacon collision in advance. For example, a possibility of the generation of the beacon collision is high in such a situation that the reception interval between the beacons is above the threshold thus far with a large margin, but the reception interval becomes below the threshold at a certain time point. Therefore, in the above-mentioned situation, it is regarded that the change in the state of the reception beacon is caused to check the beacon update info field. In contrast to the above, when the reception interval between the beacons from the different peripheral communication stations is below the threshold thus far, but the reception interval becomes above the threshold at a certain time point, it is also regarded that the change in the state of the reception beacon is caused.

In a case where the reception beacon change information is composed of 1 bit, when the reception beacon is changed as shown in FIGS. 5, 6, and 8, the change is notified by setting 1 in the bit field of the beacon update info in the transmission beacon of its own station. In order to notify the peripheral communication station that the reception state of the beacon is changed, such a method is effective of transmitting not only the beacon immediately after detecting the change in the beacon reception state but also the beacon in which 1 is set in the field for several frames thereafter (the beacon transmission cycles).

However, in a case where the reception beacon change information is composed of 1 bit, the bit field of the beacon update info is not set continuously thereafter, and when a normal state is established, 0 is set. In this case, if the peripheral station does not accidentally receive the "beacon frame in which 1 is set", there is a problem that the peripheral station misses the generation of the change. In order to solve this problem, instead of using the 1-bit flag, the reception beacon change information may be composed of a numeric value such as a counter value. The numeric value is changed each time the reception beacon state is changed (count up). A setting example for the reception beacon change information in this case will be described.

FIG. 9 illustrates a communication sequence example in which the communication station STA2 receives the beacons from the two communication stations the STA0 and the STA1. It should be noted that in the same drawing, the highlighted beacons are the reception beacons, and the other beacons are the beacons which are not received.

At the beginning, the communication station STA2 receives only the beacon from the STA1 and places 0x00 as a value for the reception beacon change information. After that, as the communication station STA2 receives the B0-1 from the STA0 (which has not been received thus far), it is regarded that the reception beacon state is changed. In response to this situation, the communication station STA2 changes the value of the reception beacon change information to 0x01 to be placed on the beacon of its own station.

The peripheral communication station existing in the reaching range of the beacon from the STA2 holds the value (0x00) of the reception beacon change information which has been used by the communication station STA2 thus far. By comparing the held value with a value (0x01) of the reception beacon change information which is described on the newly received beacon, it is possible to detect the change in the reception state of the beacon in the STA2. The peripheral communication station of the STA2 holds the value of the reception beacon change information as 0x01 while the scheduled beacon reception is performed.

After that, the STA2 does not receive the beacon B1-2 from the STA1 which is expected to be received. Therefore, in response to the situation, the STA2 changes the value of the reception beacon change information again to 0x02 to be placed on the beacon of its own station. Through a similar procedure to the above, the peripheral communication station of the STA2 can detect the change in the reception state of the beacon again in the communication station STA2.

It should be noted that in the example shown in FIG. 8, if the beacon from the peripheral communication station is not received at the scheduled time, it is immediately determined that the reception state of the beacon is changed. However, although the beacon signal from the peripheral communication station is transmitted at a correct timing, an error is caused in the beacon signal by accident, and the beacon signal is not properly received, for example. Thus, such a case is plausible that the reception state of the beacon is not actually changed. The transmission signal error is a typically generated phenomenon in particular in the wireless communication environment. In view of the above, when the change in the reception state of the beacon from the peripheral communication station is determined, the communication station may apply a filtering algorithm not to erroneously determine the accidental error of the beacon signal as the change in the beacon reception state.

For example, the communication station may determine that the beacon reception state is changed only when the scheduled beacon reception from the peripheral communication station is not received continuously for a predetermined time, not once. Alternatively, may determine that the beacon reception state is changed only when the scheduled beacon reception from the peripheral communication station is not received N times out of M times from the immediate beacon reception scheduled time (it should be noted that M and N are positive integers, and M≧N is established).

In the above, for convenience, the description has been given on the premise that the respective communication stations transmit the beacons in the same cycle. However, depending on a system, there are cases in which the respective communication stations transmit the beacons in the different cycles. In the following description, a description will be given of a method of solving the beacon hidden terminal problem in a case where the beacon transmission cycles of the respective communication stations are not constant.

Figure 10:
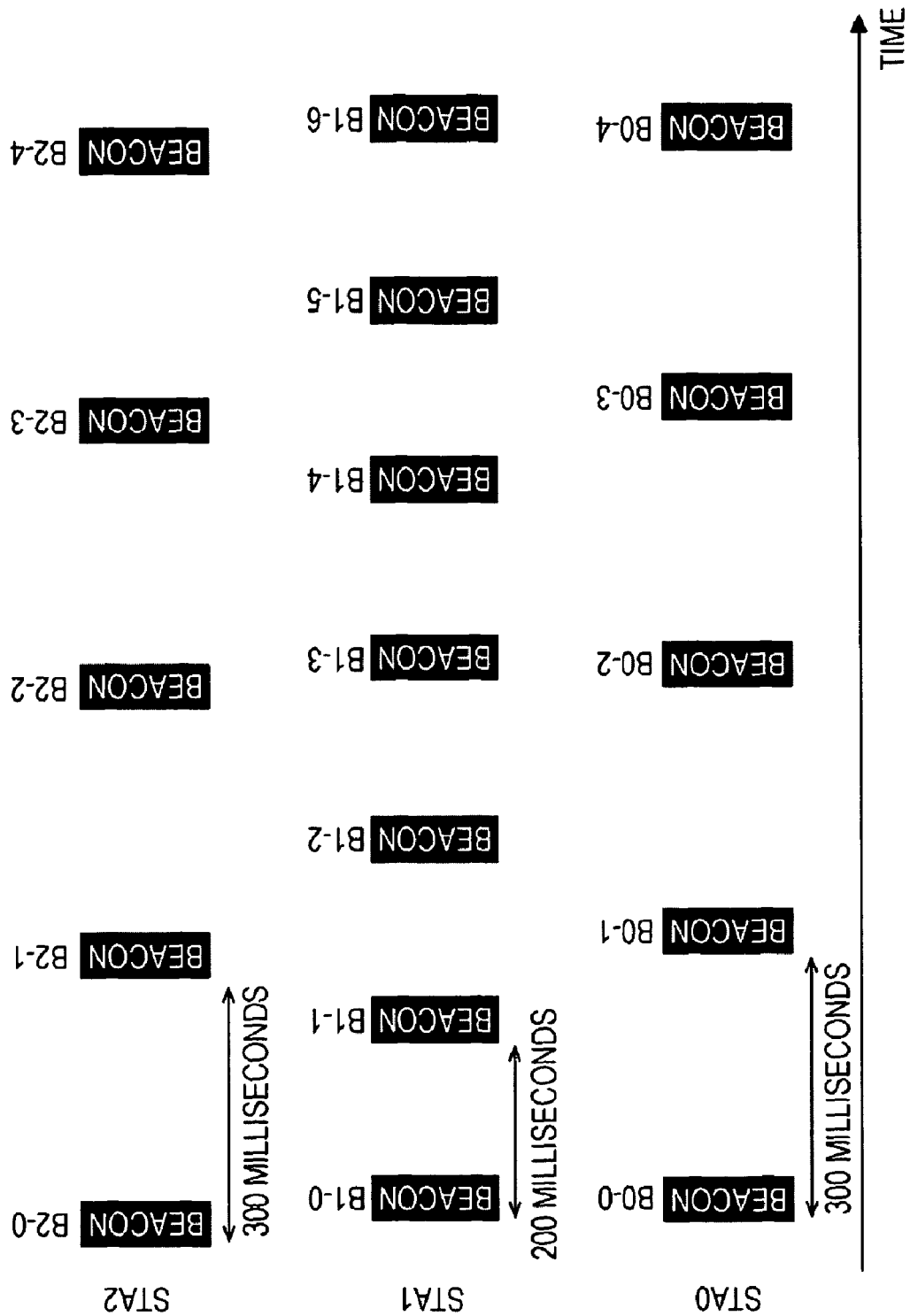
FIG. 10 is an explanatory diagram for describing a solving method for a beacon hidden terminal problem in a case where the beacon transmission cycles of the respective communication stations are not constant.

FIG. 10 illustrates a communication sequence example in which a plurality of communication stations transmit the beacons in different cycles. In the same drawing, the STA0 which transmits beacons at an interval of 300 milliseconds and the STA1 which transmits beacons at an interval of 200 milliseconds with the STA2 exist as the adjacent stations, and the beacons transmitted from the STA0 and the STA1 periodically collide with each other once in several times.

The communication station STA2 which receives the beacons transmitted from the STA0 and the STA1 can easily calculate at what time the beacon transmission is scheduled afterwards on the basis of the respective beacon reception times and beacon transmission intervals. Also, even in the case of the communication station which is not the directly adjacent station for the STA2, if the station is the directly adjacent station for the STA0 or the STA1, the beacon timing information is described on the beacon from the STA0 or the STA1. Therefore, similarly, for the communication station which is not the directly adjacent station, the STA2 can easily calculate at what time the beacon transmission is scheduled in future on the basis of a relative reception time (Beacon Rx Time) described as beacon timing information in the beacons respectively received from the STA0 and the STA1 and a beacon interval (see FIG. 7).

The STA2 calculates the frequency of the potentially generated beacon collisions from the beacon time information and the beacon transmission cycles received from the STA0 and the STA1. Then, the seriousness of the collisions is determined by using the frequency of the collisions as the reference.

Figure 11:
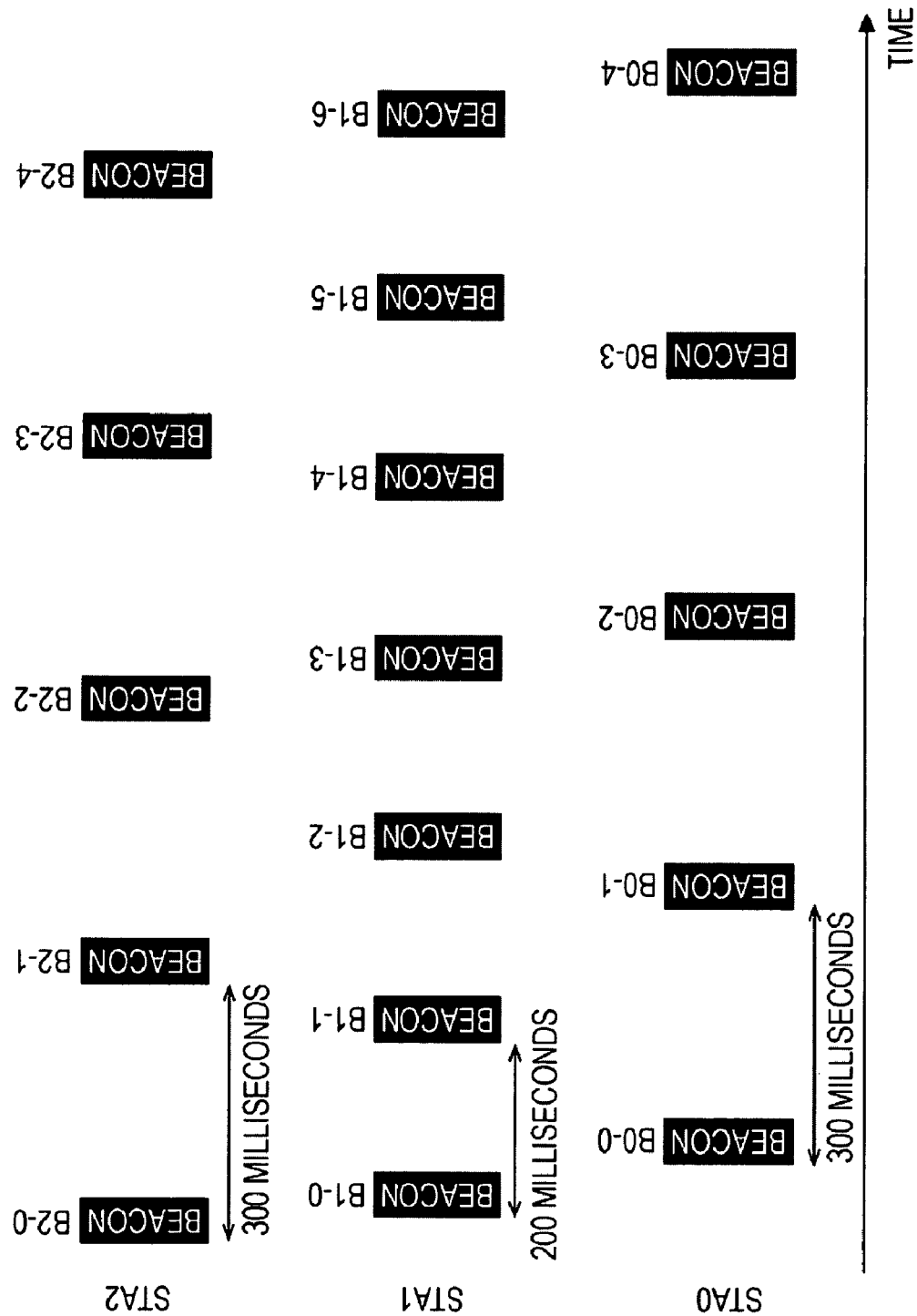
FIG. 11 is an explanatory diagram for describing a solving method for the beacon hidden terminal problem in a case where the beacon transmission cycles of the respective communication stations are not constant.

Also, FIG. 11 illustrates another communication sequence example in which the beacons are transmitted from the STA0 and the STA1 in different transmission cycles. Similarly to the above, the STA0 and the STA2 which transmit the beacon at an interval of 300 milliseconds, and the STA1 which transmits the beacon at an interval of 200 milliseconds exist as adjacent stations. The STA2 calculates the frequency of the potentially generated beacon collisions from the beacon time information and the beacon transmission cycles received from the STA0 and the STA1 to determine whether or not the collision is serious. In the example shown in the drawing, as the number of collisions between the transmission beacons of the STA0 and the STA1 generated until a certain time in future is 0, the value if below the threshold, and it is determined that the beacons of the stations are not collided with each other.

It should be noted that in the example shown in FIGS. 10 and 11, it is supposed that the STA0 and the STA1 are both the adjacent stations of the STA2, and the STA0 and the STA1 are the hidden terminals, but of course, the gist of the present invention is not limited to the above. For example, even when the STA0 is not the adjacent station of the STA2, but if the STA0 is the adjacent station of the STA1 and the STA1 is notified of the beacon transmission time of the STA0 or the like via the beacon timing information, the STA2 can calculate the beacon transmission time of the STA0 from this information. Similarly to the above, it is possible to calculate a frequency of the beacon collisions to be generated in future.

Figure 12:
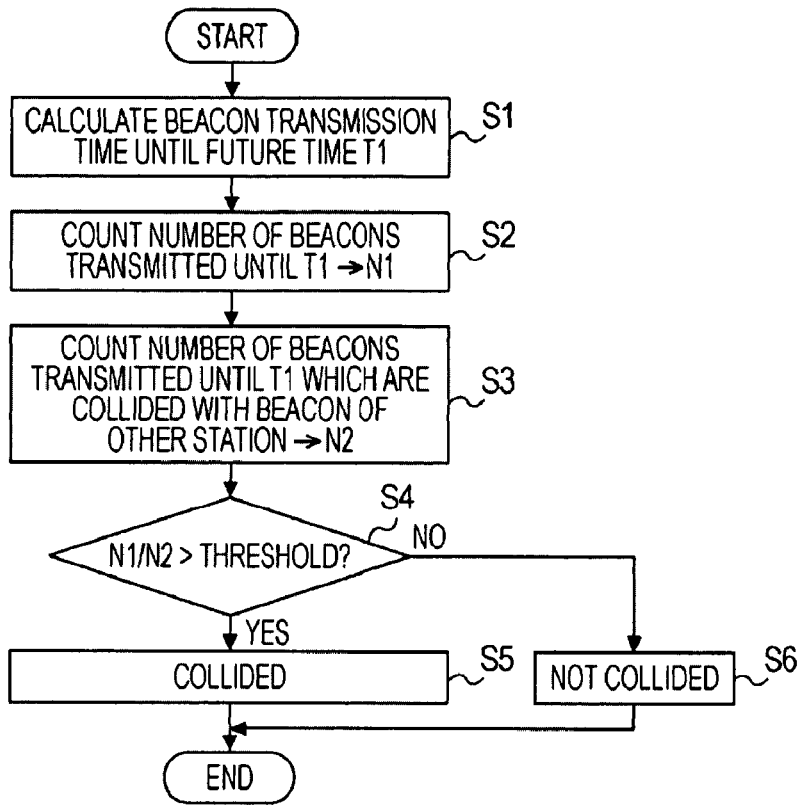
FIG. 12 is a flow chart showing a processing procedure for the communication station to determine whether or not beacons collide with each other of the respective adjacent stations which send the beacons in different transmission cycles.

FIG. 12 is a flow chart of a processing procedure for the communication station to determine whether or not there is a collision between beacons of the respective adjacent stations which transmit the beacons in different transmission cycles. In the following description, the following case is exemplified for the description that the STA2 having the STA0 and the STA1 as both the directly adjacent stations determines whether or not there is a collision regarding the reception beacon of its own station.

The STA2 roughly calculates the beacon transmission times afterwards scheduled by the adjacent stations STA0 and STA1, and its own station STA2 until a time T1 in future (step S1).

Then, during this period, the number of transmitted beacons is counted, and this value is set as N1 (step S2). Herein, the time T1 is set as a sufficiently large value so that N1 takes a plural number.

Furthermore, the STA2 counts the number of collision times with the beacon from the other station among the beacon transmission count N1, and this value is set as N2 (step S3).

Then, the STA2 compares N2 with the number of beacons N1 transmitted by the adjacent stations STA0 and STA1 (step S4). Then, when a ratio of the number of collisions N2 exceeds a certain pre-set threshold (Yes in step S4), it is determined that the beacons from the stations are collided with each other (step S5). When the ratio is equal to or lower than the threshold (No in step S4), it is determined that the beacons are not collided with each other (step S6).

Herein, as an example of the threshold, about 1/10 is preferable. When about one collision occurs among ten beacon transmissions, this situation is considered to be in a permissible range, and it is determined that the beacons are not collided with each other.

The above-mentioned calculation method for the reception beacon collision determination will be described more definitely. First, N1 (the count value of the beacons transmitted until the time T1) in step S2 is calculated through the following expression. It should be noted that N represents the number of adjacent stations, i indicates an index representing the communication station, i=0 is for its own station, and $0 < i \leq N$ is for the adjacent station.

Numeric Expression 1

$$N1 = \sum_{i=0}^{N} \text{Count}[f_i(t)] \quad (1)$$

The count function is a function for counting the number of rising edges of the function given as an argument, which is represented as follows.

Numeric Expression 2

$$\text{Count}[\delta(t)] = 1, \ \text{Count}\left[\sum_{k=0}^{2} \delta(t-k)\right] = 3 \quad (2)$$

The function $f_i(t)$ is an impulse function where only the beacon transmission timing has a value from the current time to an upcoming time t1, which is represented through the following expression.

Numeric Expression 3

$$f_i(t) = \sum_{k=0}^{\infty} \delta(t - k \times BcnInt_i - t0_i) \times \text{Window}(t) \quad (3)$$

$\delta(x)$ is a delta function having a value only when x=0, and the following expression is established.

Numeric Expression 4

$$\int_{-\infty}^{+\infty} A(x)\delta(x) = A(0) \quad (4)$$

Also, $BcInt_i$ denotes a beacon cycle of the communication station i, and $t0_i$ denotes the previous beacon reception time of the communication station i. A window function Window (t) is represented through the following expression (it should be noted that T0 denotes the current time, and T1 denotes a future time of the calculation target).

Numeric Expression 5

$$\text{Window}(t) = \begin{cases} 1 & T0 < t < T1 \\ 0 & \text{otherwise} \end{cases} \quad (5)$$

Also, N2 (the count value of the number of collisions with the beacons from the other station transmitted until the time T1) in step S3 in FIG. 12 is given through the following expression.

Numeric Expression 6

$$N2 = \sum_{i=0}^{N-1} \sum_{j=i+1}^{N} \text{Count}[(f_i(t) \otimes \text{Gate}(t)) \times (f_j(t) \otimes \text{Gate}(t))] \quad (6)$$

Herein, an operation symbol connecting the impulse function $f_i(t)$ and a gate function Gate (t) means a convolution multiplication. The gate function Gate (t) is given through the following expression. Also, $BT_{max}$ denotes a value obtained by adding a margin to the expected maximum beacon frame time length. When a difference between the beacon transmission timings of the communication stations is equal to or lower than $BT_{max}$, it is possible to determine that the beacon frame transmitted at the beacon transmission timing may be collided.

Numeric Expression 7

$$\text{Gate}(t) = \begin{cases} 1 & 0 < t < BT_{max} \\ 0 & \text{otherwise} \end{cases} \quad (7)$$

In the processing procedure shown in FIG. 12, when it is determined that the collision is serious, in order to overcome such a situation, the STA2 performs the hand shape for requesting the change in the beacon transmission timing to at least one of the STA0 and the STA1. With this configuration, it is possible to solve the beacon hidden terminal problem.

Figure 13:
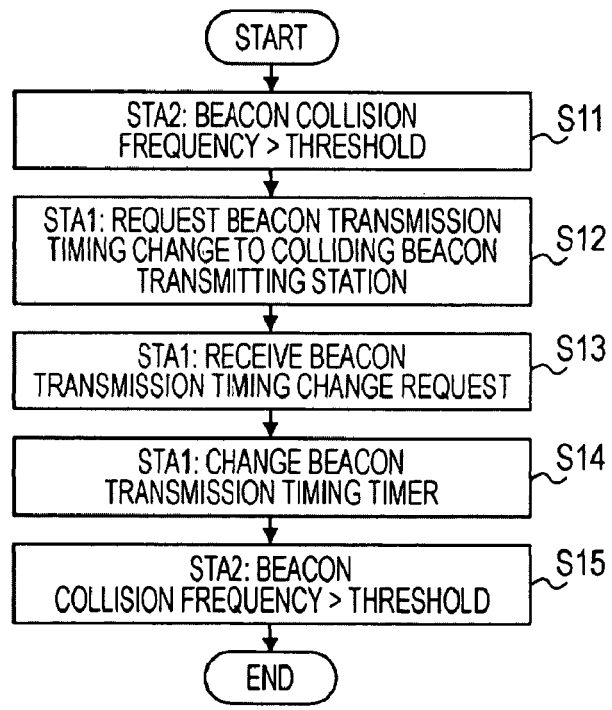
FIG. 13 is a flow chart showing a processing procedure for the peripheral communication station to change a beacon transmission timing when it is determined that the beacons are collided between the peripheral communication stations.

FIG. 13 is a flow chart of the processing procedure for the communication station (the STA2) to request the peripheral communication station (the STA1) for the change in the beacon transmission timing when it is determined that the beacons are collided between the peripheral communication stations. It should be noted that the beacon transmission times of the peripheral communications stations STA0 and STA1 are assumed to have the relation shown in FIG. 10 at the beginning.

First, on the basis of the beacon reception times and the beacon transmission intervals from the STA0 and the STA1, respectively, the STA2 calculates whether or not a collision beacon exists in the reception of its own station and further determines the seriousness of the collisions in accordance with the beacon collision frequency (step S11) (see FIG. 12).

Herein, as the collision frequency exceeds the threshold, the STA2 determines that the beacon collision is periodically generated. The STA2 issues a request message to the one peripheral communications station STA0 for notifying that the beacon transmission time is to be changed (step S12).

In contrast to this, when the STA0 receives the message from the STA2 notifying that the beacon transmission time is to be changed (step S13), as the collision is generated with the beacon of the hidden terminal (the STA1) for its own station (or, the collision is serious), the STA0 recognizes that it is difficult for the STA2 to receive the beacon of the STA0. Then, the beacon transmission timing of its own station is changed by setting forward or backward the timer which performs the time management at its own station (step S14).

With this configuration, the transmission time (absolute time) at which the STA0 transmits the beacon afterward is changed. As a result, the beacon transmission times of the STA0 and the STA1 is as shown in FIG. 11. That is, the collision frequency of the beacons from the peripheral communication stations is decreased, and it is possible to recover from the state where the collision is serious.

It should be noted that when the STA2 recognizes the beacon collision, a method disclosed in Japanese Unexamined Patent Application Publication No. 2005-151525 and the like can be applied for a determination regarding to which communication station the beacon transmission time change request message is to be transmitted.

Also, as the STA2 places the beacon timing information of the respective peripheral communications stations STA0 and STA1 in the beacon (see FIG. 7), instead of receiving the above-mentioned request message from the STA2, the adjacent station STA0 analyzes the placement content of the reception beacon from the STA2 and autonomously recognizes that it is difficult for the STA2 to receive the beacon of the STA0 as the beacon collision with the hidden terminal STA1 is generated.

In such a case, the STA0 extracts the beacon transmission time and the beacon transmission interval from the beacon timing information of the STA1 placed on the reception beacon from the STA2. Then, the STA0 executes the processing procedure shown in FIG. 12 on the basis of the future beacon transmission times and the beacon transmission intervals of its own station and the hidden terminal STA1.

The future beacon transmission times of their own stations STA0 and STA1 are roughly calculated until the time T1 in future, and the number of beacons transmitted from its own station is counted. This value is set as N1 (the time T1 is set as a sufficiently large number so that N1 becomes a plural number). Furthermore, the STA0 counts the number of collisions with the other station STA1 among these N1 beacons, and this value is set as N2. Then, the STA0 calculates a ratio of the N1 beacons transmitted by its own station to the number of collisions N2 with the beacons from the other station. When this ratio is above the predetermined threshold, the STA0 determines that the beacon of its own station is collided with the beacon of the STA1. When the collision state is determined, the STA0 changes the beacon transmission timing by setting forward or backward the timer for performing the time management at its own station.

With this configuration, the transmission time (absolute time) at which the STA0 transmits the beacon afterward is changed. As a result, the beacon transmission times of the STA0 and the STA1 are as shown in FIG. 11. That is, the collision frequency of the beacons from the peripheral communication stations is decreased, and it is possible to recover from the state where the collision is serious.

In the above description, the case in which the STA0 and the STA1 are the adjacent station is supposed, but of course, also in a case where both the stations are the adjacent stations, the STA0 can calculate the future beacon transmission time of the STA1 on the basis of the beacon reception history directly received from the STA1. Similarly to the above, a rough ratio at which the collisions are generated in future can be calculated, and further it is possible to activate the operation for avoiding the beacon collisions.

Also, in the above description, the case in which the adjacent station of the STA0 is only the STA2 is supposed. In a case where a plurality of adjacent stations exist, the above-mentioned processing is performed sequentially on all the adjacent stations, so that it is possible to autonomously eliminate the beacon collisions at the respective adjacent stations.

The calculation method for determining the "beacon collision at the adjacent station i" will be examined more closely. First, the count value N1 calculated in step S2 in the flow chart shown in FIG. 12 is given through the following expression.

Numeric Expression 8

$$N1 = \text{Count}[f_0(t)] + \sum_{STAID(j) \ne MySTAID}^{n_j-1} \text{Count}([g_{i,j}(t)]) \quad (8)$$

Count [$f_0$ (t)] is the same as shown in the above-mentioned expressions (2) and (3) and denotes the number of the beacon transmission timings of its own station scheduled from the current time to the upcoming time T1. Also, $n_i$ denotes the number of elements in the beacon timing information of the adjacent station described in the beacon received from the adjacent station i.

Then, $g_{i,j}(t)$ is an impulse function in which a value is provided only at the beacon transmission timing from the current time to the upcoming time T1, which is represented by the following expression.

Numeric Expression 9

$$g_{i,j}(t) = \sum_{k=0}^{\infty} \delta(t - k \times BcnInt_{i,j} - t0_{i,j}) \times \text{Window}(t) \quad (9)$$

BcInt$_{i,j}$ denotes a beacon cycle represented by the j-th beacon timing information element from the communication station i. Then, $t0_{i,j}$ denotes a previous beacon reception time represented by the j-th beacon timing information element from the communication station i.

The second term in the right side member of the above-mentioned expression (8) represents the number of the beacon transmission timings scheduled from the current time to the future time T1 regarding all the elements except for its own station among the beacon timing information from the communication station i.

Also, N2 calculated in step S3 in the flow chart shown in FIG. 12 (the count value of the number of collisions with the beacons from the other station among the beacons transmitted until the upcoming time T1) is given through the following expression.

Numeric Expression 10

$$N2 = \sum_{STAID(j) \ne MySTAID}^{n_j-1} \text{Count}[(f_0(t) \otimes \text{Gate}(t)) \times (g_{i,j}(t) \otimes \text{Gate}(t))] \quad (10)$$

According to the above-mentioned expression (10), N2 id calculated as the number of the collisions between the upcoming beacon transmission timing of its own station and the upcoming beacon transmission timing of the reception beacon notified by the adjacent station i (except for those of its own station).

The probability of the beacon collision in the adjacent station i is calculated in the above-mentioned manner, and this processing is performed for the respective adjacent stations. Then, when the beacon collision probability of any of the adjacent stations exceeds the threshold, the changing procedure for the beacon transmission timing of its own station is activated.

Even when the respective communication stations transmit the beacons in different cycles, on the basis of the beacon reception time and the beacon transmission cycles of the respective communication stations placed in the reception beacon as the beacon timing information, it is possible to calculate the beacon transmission time over the future. When the beacon is started to be newly transmitted or the beacon transmission time is changed, the communication station calculates the respective future beacon transmission times on the basis of the beacon timing information of the peripheral communication station collected through the beacons received from the adjacent station and selects a time period during which the collision with these beacons is not caused (or the state where the collision is not serious), so that the beacon transmission time and the beacon transmission cycles of its own station may be decided.

The method for the communication station to decide the beacon transmission timing will be described with reference to FIG. 14. In the same drawing, such a case is supposed that the STA2 newly decides the beacon transmission timing under an environment where three stations including the STA0, the STA1, and the STA2 exist. It should be noted that the STA0 and the STA1 are in a relation of being an adjacent station of the STA2 or an adjacent station of the relevant adjacent station (2 hops away).

The STA2 can calculate the beacon transmission times of the STA0 and the STA1 across the future from the beacon timing information placed in the beacons received from the STA0 or the STA1.

Figure 14:
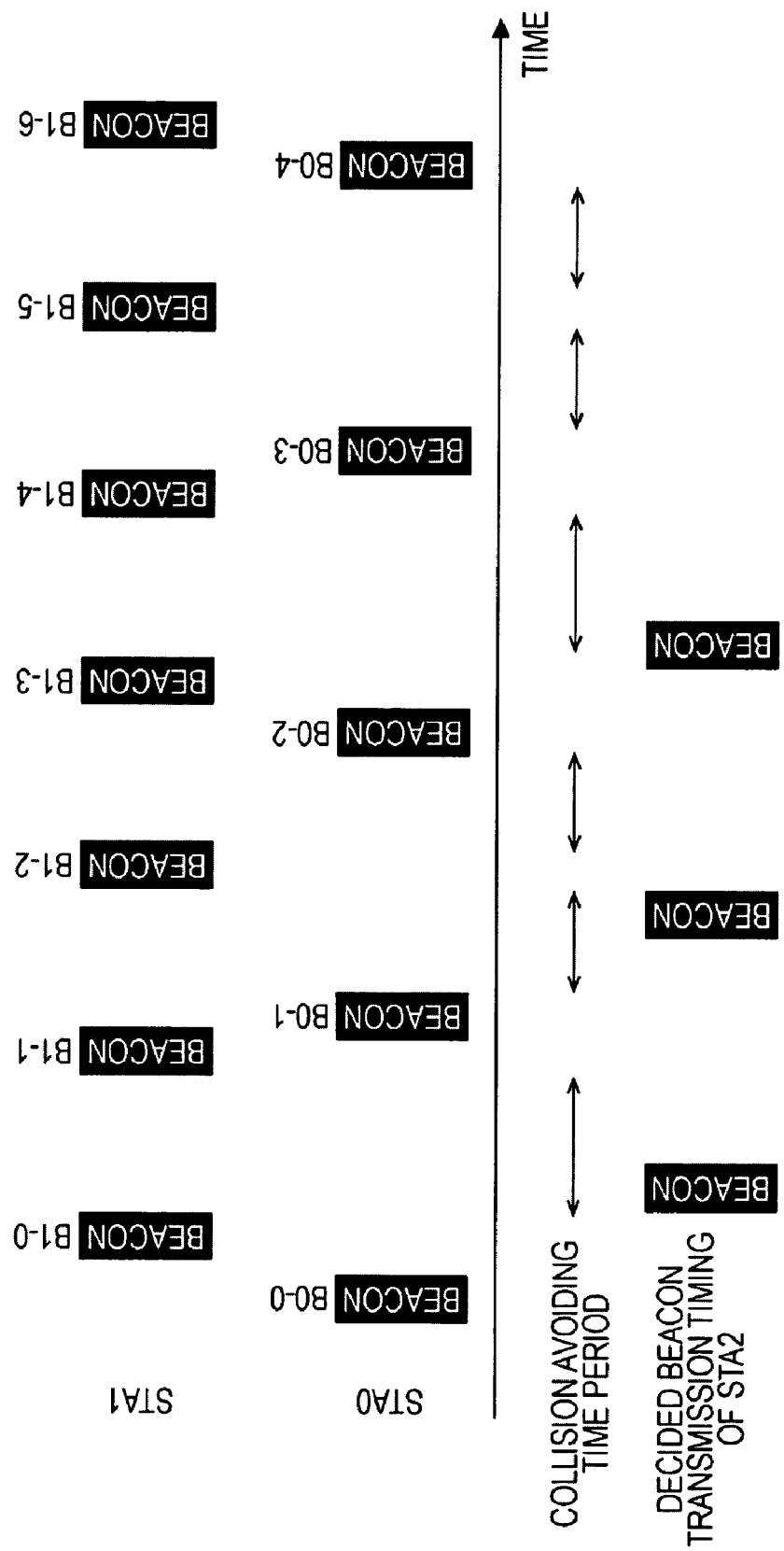
FIG. 14 is an explanatory diagram for describing a method for the communication station to decide the beacon transmission timing.
Figure 17:
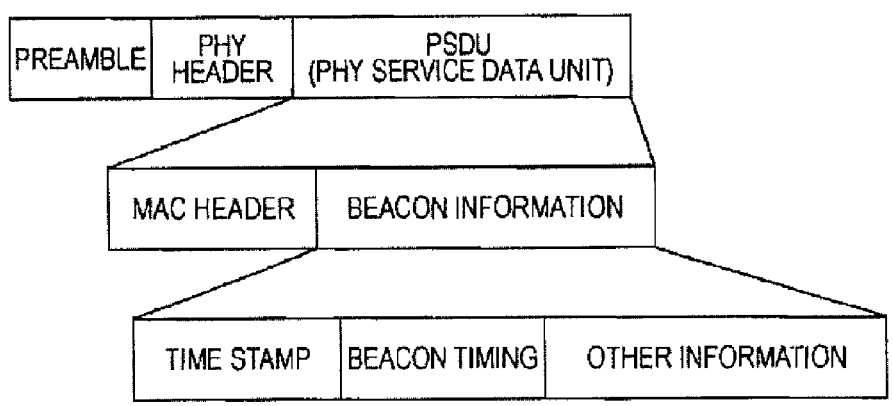
FIG. 17 illustrates a format example of a beacon frame.
Figure 18:
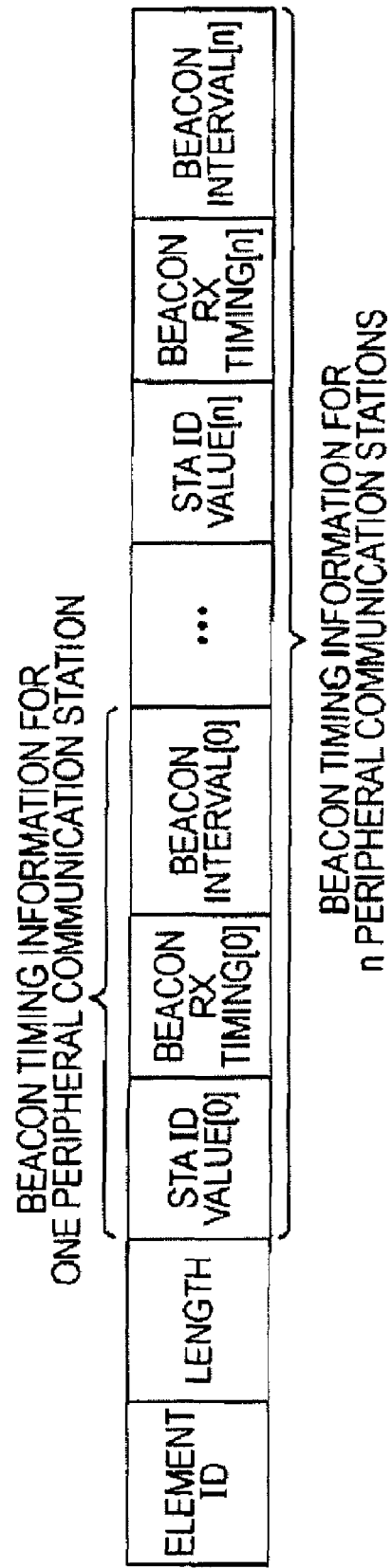
FIG. 18 illustrates a content of the beacon timing information.

At this time, the beacon transmission times of both the stations STA0 and STA1 are supposed to be in a relation shown in the upper stage of FIG. 14. The STA2 generates this information in its own station and extracts time periods during which no collision is caused with the beacons transmitted from the peripheral communications stations STA0 and STA1 as shown in the middle stage of FIG. 14. Then, the STA2 decides the transmission times and the beacon transmission cycles so as to transmit the beacons of its own station during these time slots.

As a result, the STA2 decides the performance of the beacon transmission at the times and in the cycles shown in the lower stage of FIG. 14. With this configuration, the STA2 can transmit the beacon so as not to be overlapped with the beacon transmission times of the peripheral communications stations STA0 and STA1.

It should be understood by those skilled in the art that various modifications, combinations, sub-combinations and alterations may occur depending on design requirements and other factors insofar as they are within the scope of the appended claims or the equivalents thereof.

What is claimed is:

1. A communication apparatus comprising:
  a reception unit configured to receive first beacons from at least one peripheral communication station;
  a beacon generation unit configured to generate a second beacon on which beacon timing information related to a reception time of the first beacon having a high priority among the first beacons received from the peripheral communication stations is placed, based on a change in reception state of at least one of the first beacons;
  a transmission unit configured to transmit the second beacon generated by the beacon generation unit; and
  a timing control unit configured to control transmission timing of the second beacon so as to avoid a collision with the first beacons transmitted from the peripheral communication stations.

2. The communication apparatus according to claim 1, wherein the beacon generation unit places information on the second beacon indicating whether information about all received first beacons is placed on the second beacon.

3. The communication apparatus according to claim 2, wherein the beacon generation unit places information on the second beacon indicating whether or not a reception state of a first beacon has changed.

4. The communication apparatus according to claim 3, wherein in response to a request from a peripheral communication station more pieces of beacon timing information than the information placed on the second beacon is provided to the requesting peripheral communication station using a handshake operation.

5. The communication apparatus according to claim 3, wherein the information indicating whether or not a reception state of the first beacon is changed is composed of a numeric value, and when a reception state of the first beacon is changed, the numeric value is increased.

6. The communication apparatus according to claim 5, wherein when the reception state of the first beacon is determined by a control unit to have been changed, and further it is determined that more pieces of first beacon timing information than the information placed on the first beacon should be obtained, the transmission unit controls a handshake operation for obtaining all the beacon timing information from a transmission source of the first beacon.

7. The communication apparatus according to claim 3, wherein the change in the reception state of the first beacon comprises at least one of the following: disappearance of a first beacon which has been periodically received thus far, starting of reception of a first beacon which has not been observed thus far, change in the transmission interval of a first beacon which has been received thus far, and change in proximity in reception intervals of first beacon signals received from different peripheral communication stations.

8. A communication apparatus comprising:
a reception unit configured to receive first beacons from at least one peripheral communication station;
a beacon generation unit configured to generate a second beacon on which beacon timing information related to a reception time of the first beacon having a high priority among the first beacons from the peripheral communication stations is placed, the high priority, among the first beacons received, being awarded to a first beacon from one peripheral communication station whose reception interval is sufficiently close to the first beacon received from another peripheral communication station that a collision may occur due to fluctuation in beacon transmission timing;
a transmission unit configured to transmit the second beacon generated by the beacon generation unit; and
a timing control unit configured to control transmission timing of the second beacon so as to avoid a collision with the first beacons transmitted from peripheral communication stations.

9. A communication apparatus comprising:
reception means configured to receive a frame including a beacon from a peripheral communication station;
beacon analysis means configured to analyze the beacon received by the reception means;
beacon generation means configured to generate a beacon on which beacon time information related to the respective beacons received from the peripheral communication station and beacon timing information including a beacon transmission cycle are placed;
transmission means configured to transmit a frame including the beacon generated by the beacon generation means;

control means configured to control frame transmission and reception operations performed by the transmission means and the reception means; and
timing control means configured to control frame transmission and reception timings including a beacon transmission timing of its own station so as to avoid a collision with the beacon transmitted from the peripheral communication station on the basis of beacon timing information of the peripheral communication station obtained from a result of the beacon analysis performed by the beacon analysis means,
wherein the control means calculates a frequency of potentially generated beacon collisions on the basis of beacon time information and a beacon transmission cycle of the peripheral communication station which has received the beacon by itself and beacon time information and a beacon transmission cycle related to the peripheral communication station described in the received beacon and performs a processing for avoiding the beacon collisions in its own station and the peripheral communication station in accordance with the frequency of the collisions.

10. The communication apparatus according to claim 9, wherein the control means calculates the frequency of the potentially generated beacon collisions on the basis of beacon time information and a beacon transmission cycle of the respective peripheral communication stations obtained from the analysis result of the beacon timing information placed on the received beacon, determines a seriousness of the collisions by using the frequency of the collisions as a reference, and performs a processing for requesting a change in the beacon transmission timing to a peripheral communication station determined to have the serious collisions.

11. A communication method comprising the steps of:
receiving first beacons from at least one peripheral communication station;
generating a second beacon on which beacon timing information related to a reception time of the first beacon having a high priority among the first beacons from the peripheral communication stations is placed, based on a change in reception state of at least one of the first beacons;
transmitting the second beacon; and
controlling transmission timing of the second beacon so as to avoid a collision with the first beacons transmitted from peripheral communication stations.

12. A communication method comprising the steps of:
receiving a frame including a beacon from a peripheral communication station;
analyzing the beacon received in the reception step;
generating a beacon on which beacon time information related to the respective beacons received from the peripheral communication station and beacon timing information including a beacon transmission cycle are placed;
transmitting a frame including the beacon generated in the beacon generation step;
controlling frame transmission and reception operations performed in the transmission step and the reception step;
controlling frame transmission and reception timings including a beacon transmission timing of its own station while so as to avoid a collision with the beacon transmitted from the peripheral communication station on the basis of beacon timing information of the peripheral communication station obtained from a result of the beacon analysis performed in the beacon analysis step; and calculating a frequency of potentially generated beacon collisions on the basis of beacon time information and a beacon transmission cycle of the peripheral communication station which has received the beacon by itself and beacon time information and a beacon transmission cycle related to the peripheral communication station described in the received beacon and performing a processing for avoiding the beacon collisions in its own station and the peripheral communication station in accordance with the frequency of the collisions.

13. A computer-readable computer program for executing a processing on a computer to operate as a communication station under a communication environment where the respective communication stations operating in an autonomous distributed manner establish a Peer to Peer connection, the program allowing the computer to function as:
   a reception unit configured to receive a first beacon from at least one peripheral communication station;
   a beacon generation unit configured to generate a second beacon on which beacon timing information related to a reception time of the first beacon having a high priority among the first beacons from the peripheral communication stations is placed, based on a change in reception state of at least one of the first beacons;
   a transmission unit configured to transmit the second beacon generated by the beacon generation unit; and
   a timing control unit configured to control transmission timing of the second beacon so as to avoid a collision with the first beacons transmitted from peripheral communication stations.

14. A computer-readable computer program for executing a processing on a computer to operate as a communication station under a communication environment where the respective communication stations operating in an autonomous distributed manner establish a Peer to Peer connection, the program allowing the computer to function as:
   a reception unit configured to receive a frame including a beacon from a peripheral communication station;
   a beacon analysis unit configured to analyze the beacon received by the reception unit;
   a beacon generation unit configured to generate a beacon on which beacon time information related to the respective beacons received from the peripheral communication station and beacon timing information including a beacon transmission cycle are placed;
   a transmission unit configured to transmit a frame including the beacon generated by the beacon generation unit;
   a control unit configured to control frame transmission and reception operations performed by the transmission unit and the reception unit; and
   a timing control unit configured to control frame transmission and reception timings including a beacon transmission timing of its own station so as to avoid a collision with the beacon transmitted from the peripheral communication station on the basis of beacon timing information of the peripheral communication station obtained from a result of the beacon analysis performed by the beacon analysis unit,
   wherein the control unit calculates a frequency of potentially generated beacon collisions on the basis of beacon time information and a beacon transmission cycle of the peripheral communication station which has received the beacon by itself and beacon time information and a beacon transmission cycle related to the peripheral communication station described in the received beacon and performs a processing for avoiding the beacon collisions in its own station and the peripheral communication station in accordance with the frequency of the collisions.

15. A communication system comprising a plurality of communication stations arranged to each respectively transmit a beacon at a predetermined transmission interval on which beacon time information related to a beacon received from a peripheral communication station is placed and control a beacon transmission timing of its own station so as to avoid a collision with the beacon transmitted from the peripheral communication station on the basis of beacon information placed on the received beacon,
   wherein at least a part of the communication stations includes means configured to decide a priority with respect to beacons received from at least one peripheral communication station and means configured to place beacon time information of a beacon having a high priority among the received beacons, the high priority being set to a beacon whose reception state is changed, on a beacon of its own station, and transmits the beacon at a predetermined transmission interval.

16. A communication system comprising a plurality of communication stations arranged to respectively transmit a beacon on which beacon time information and a beacon transmission cycle related to a beacon received from a peripheral communication station are placed at a predetermined transmission interval and transmit the beacon in each beacon transmission cycle of its own station so as to avoid a collision with the beacon transmitted from the peripheral communication station on the basis of beacon information placed on the received beacon,
   wherein at least a part of the communication stations calculates a frequency of potentially generated beacon collisions on the basis of beacon time information and a beacon transmission cycle of the peripheral communication station which has received the beacon by itself and beacon time information and a beacon transmission cycle related to the peripheral communication station described in the received beacon and performs a processing for avoiding the beacon collisions in its own station and the peripheral communication station in accordance with the frequency of the collisions.

17. A communication apparatus comprising:
   a reception unit configured to receive a frame including a beacon from a peripheral communication station;
   a beacon analysis unit configured to analyze the beacon received by the reception unit;
   a beacon generation unit configured to generate a beacon on which beacon time information related to the respective beacons received from the peripheral communication station and beacon timing information including a beacon transmission cycle are placed;
   a transmission unit configured to transmit a frame including the beacon generated by the beacon generation unit;
   a control unit configured to control frame transmission and reception operations performed by the transmission unit and the reception unit; and
   a timing control unit configured to control frame transmission and reception timings including a beacon transmission timing of its own station so as to avoid a collision with the beacon transmitted from the peripheral communication station on the basis of beacon timing information of the peripheral communication station obtained from a result of the beacon analysis performed by the beacon analysis unit, wherein the control unit calculates a frequency of potentially generated beacon collisions on the basis of beacon time information and a beacon transmission cycle of the peripheral communication station which has received the beacon by itself and beacon time information and a beacon transmission cycle related to the peripheral communication station described in the received beacon and performs a processing for avoiding the beacon collisions in its own station and the peripheral communication station in accordance with the frequency of the collisions.

18. The communication apparatus according to claim 17, wherein the control unit calculates the frequency of the potentially generated beacon collisions on the basis of beacon time information and a beacon transmission cycle of the respective peripheral communication stations obtained from the analysis result of the beacon timing information placed on the received beacon, determines a seriousness of the collisions by using the frequency of the collisions as a reference, and performs a processing for requesting a change in the beacon transmission timing to a peripheral communication station determined to have the serious collisions.

19. A communication system comprising a plurality of communication stations arranged to each respectively transmit a beacon at a predetermined transmission interval on which beacon time information related to a beacon received from a peripheral communication station is placed and control a beacon transmission timing of its own station so as to avoid a collision with the beacon transmitted from the peripheral communication station on the basis of beacon information placed on the received beacon, wherein at least a part of the communication stations includes a unit configured to decide a priority with respect to beacons received from at least one peripheral communication station and a unit configured to place beacon time information of a beacon having a high priority among the received beacons, the high priority being set to a beacon whose reception state is changed, on a beacon of its own station, and transmits the beacon at a predetermined transmission interval.

20. A communication system comprising a plurality of communication stations arranged to respectively transmit a beacon on which beacon time information and a beacon transmission cycle related to a beacon received from a peripheral communication station are placed at a predetermined transmission interval and transmit the beacon in each beacon transmission cycle of its own station so as to avoid a collision with the beacon transmitted from the peripheral communication station on the basis of beacon information placed on the received beacon, wherein at least a part of the communication stations calculates a frequency of potentially generated beacon collisions on the basis of beacon time information and a beacon transmission cycle of the peripheral communication station which has received the beacon by itself and beacon time information and a beacon transmission cycle related to the peripheral communication station described in the received beacon and performs a processing for avoiding the beacon collisions in its own station and the peripheral communication station in accordance with the frequency of the collisions.

* * * * *